US010979202B2

(12) United States Patent
Ge et al.

(10) Patent No.: US 10,979,202 B2
(45) Date of Patent: Apr. 13, 2021

(54) NEURAL-NETWORK-BASED DISTANCE METRIC FOR USE IN A COMMUNICATION SYSTEM

(71) Applicants: Yiqun Ge, Ottawa (CA); Wuxian Shi, Ottawa (CA); Wen Tong, Ottawa (CA)

(72) Inventors: Yiqun Ge, Ottawa (CA); Wuxian Shi, Ottawa (CA); Wen Tong, Ottawa (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 16/534,653

(22) Filed: Aug. 7, 2019

(65) Prior Publication Data

US 2021/0044411 A1  Feb. 11, 2021

(51) Int. Cl.
| | |
|---|---|
| H04L 5/00 | (2006.01) |
| G06N 3/08 | (2006.01) |
| G06F 17/18 | (2006.01) |
| G06N 20/20 | (2019.01) |
| G06N 3/04 | (2006.01) |

(52) U.S. Cl.
CPC ............ *H04L 5/0069* (2013.01); *G06F 17/18* (2013.01); *G06N 3/0454* (2013.01); *G06N 3/08* (2013.01); *G06N 20/20* (2019.01)

(58) Field of Classification Search
CPC ......... H04L 5/0069; G06F 17/18; G06N 3/08; G06N 3/0454; G06N 20/20
See application file for complete search history.

(56) References Cited

U.S. PATENT DOCUMENTS

| | | | |
|---|---|---|---|
| 10,581,469 B1* | 3/2020 | O'Shea | H04B 1/0475 |
| 10,725,735 B2* | 7/2020 | Guttmann | G06F 21/6218 |
| 2009/0094492 A1 | 4/2009 | Music et al. | |
| 2017/0105210 A1* | 4/2017 | Mar | H04B 17/3912 |
| 2018/0308013 A1* | 10/2018 | O'Shea | G06N 3/0454 |
| 2019/0065962 A1 | 2/2019 | Busch et al. | |
| 2019/0274108 A1* | 9/2019 | O'Shea | G06N 3/0472 |

FOREIGN PATENT DOCUMENTS

| | | |
|---|---|---|
| CN | 101444123 A | 5/2009 |
| CN | 107392024 A | 11/2017 |
| CN | 107943750 A | 4/2018 |
| JP | H0895950 A | 4/1996 |

* cited by examiner

*Primary Examiner* — Hassan Kizou
*Assistant Examiner* — Hector Reyes

(57) ABSTRACT

Methods and apparatuses for measuring a distance between two signal distributions in a common signal space are described. A measurement network is configured to receive first and second signal distributions as input and output a measurement of a Wasserstein distance between the first and second signal distributions. The measurement network may be implemented using a neural network.

16 Claims, 18 Drawing Sheets

NEURAL-NETWORK-BASED DISTANCE METRIC FOR USE IN A COMMUNICATION SYSTEM

FIELD

The present disclosure is related to methods and systems for measuring the distance between two signal distributions in signal space.

BACKGROUND

In a modern communication system, a goal of the physical layer interface is usually to increase system capacity (e.g., increase number of users and/or multiplexed data streams) given a limited bandwidth and time resource. In general, approaches to achieving this goal include adding new dimension(s) to a signal space and/or improving the resource allocation resolution of a signal space.

Existing communication techniques (at the transmitter and at the receiver) have been developed with the aim of maximizing the Shannon channel capacity, using a metric and measurement that is based on the well-accepted Shannon-Hartley theorem. For future wireless communications developments (e.g., 5G and later generations) in particular, it will be desirable to extend the signal space for larger capacity and higher spectrum efficiency. Continued reliance on Shannon-based metric and measurement for developing new technologies for dimension extension may be unsatisfactory.

For example, the Shannon-based approach assumes a Gaussian distribution for interferences and noisy channel randomness. Such an assumption may not be an accurate representation of the actual conditions, and may result in less efficient use of the signal space at both transmitter and receiver sides.

Accordingly, it would be useful, including for future communications systems, to provide a distance metric that may be more suitable for measurements in a higher-dimensional signal space.

SUMMARY

In some example aspects, the present disclosure describes an apparatus including: a first transmitter emulator, a second transmitter emulator and a processing unit. The first transmitter emulator is configured to shape a first source signal distribution in a transmitter domain to a first transmission signal distribution. The second transmitter emulator is configured to shape a second source signal distribution in the transmitter domain to a second transmission signal distribution. The processing unit is configured to implement a channel emulator and a measurement network. The channel emulator is configured to receive the first and second transmission signal distributions and output first and second received signal distributions, the first and second received signal distributions representing transformation of the first and second transmission signal distributions, over a transmission channel, to a receiver domain of at least one receiving device. The measurement network is configured to receive the first and second received signal distributions as input and output a measurement of a Wasserstein distance between the first and second received signal distributions in the receiver domain.

In any of the examples, the measurement network may be a neural network trained to measure a Wasserstein distance between two signal distributions, each signal distribution being defined as a finite set of sub-signal distributions, and the Wasserstein distance being calculated between each set of sub-signal distributions.

In any of the examples, the measurement network may have an architecture that is selected from a set of predefined network architectures.

In any of the examples, the architecture of the measurement network may be selected based on information about at least one of the transmission channel or environment.

In any of the examples, the apparatus may be configured to receive the information about the transmission channel or environment from the at least one receiving device. The apparatus may be further configured to transmit information about the selected architecture to the at least one receiving device.

In any of the examples, the first transmitter emulator and the second transmitter emulator may emulate first and second transmitters that are implemented using respective first and second neural networks.

In any of the examples, the first and second neural networks may have been trained to generate first and second transmission signal distributions that, after transformation by the channel emulator, result in first and second received signal distributions that have a Wasserstein distance satisfying a separation criterion.

In some example aspects, the present disclosure describes a method for implementing transmitters at a transmitting apparatus. The method includes: generating a first transmission signal distribution from an input sample, using a first transmitter neural network; generating a second transmission signal distribution from another input sample, using a second transmitter neural network; generating first and second transformed signal distributions from the first and second transmission signal distributions, the first and second transformed signal distributions representing transformation of the first and second transmission signal distributions, over a transmission channel, to a receiver domain of at least one receiving device; measuring a Wasserstein distance between the first and second transformed signal distributions in the receiver domain; and when the measured Wasserstein distance satisfies a separation criterion, implement the first and second transmitter neural networks at the transmitting apparatus, and send information about the first and second transmitter neural networks to the at least one receiving device to enable the at least one receiving device to implement at least one corresponding receiving neural network.

In any of the examples, the method may also include: when the measured Wasserstein distance does not satisfy the separation criterion, performing one or more iterations of: training the first and second transmitter neural networks to generate different first and second transmission signal distributions; generating different first and second transformed signal distributions from the different first and second transmission signal distributions; and measuring the Wasserstein distance between the different first and second transformed signal distributions; wherein the one or more iterations are performed until the measured Wasserstein distance satisfies the separation criterion.

In any of the examples, the Wasserstein distance may be measured using a measurement network that is implemented using a neural network.

In any of the examples, the method may also include selecting an architecture of the measurement network from a set of predefined network architectures.

In any of the examples, the method may also include: generating a third transmission signal distribution, using a third transmitter neural network; generating a combined transformed signal distribution from a combination of the first and second transmission signal distributions, and generating a third transformed signal distribution from the third transmission signal distribution; measuring a Wasserstein distance between the combined and third transformed signal distributions in the receiver domain; and when the measured Wasserstein distance satisfies a separation criterion, further implement the third transmitter neural network at the transmitting apparatus and send information about the third transmitter neural network to the at least one receiving device.

In any of the examples, the first and second transformed signal distributions may be generated by inputting the first and second transmission signal distributions into a channel emulator, the channel emulator representing characteristics of the transmission channel for the at least one receiving device.

In any of the examples, the method may also include: receiving channel condition feedback from the at least one receiving device to update the channel emulator; generating updated first and second transformed signal distributions using the updated channel emulator; and measuring the Wasserstein distance between the updated first and second transformed signal distributions.

In some example aspects, the present disclosure describes an apparatus for measuring a distance between two signal distributions in a common signal space. The apparatus includes a processing unit configured to implement: a measurement network configured to receive first and second signal distributions as input and output a measurement of a Wasserstein distance between the first and second signal distributions.

In some example aspects, the measurement network may be a neural network trained to measure a Wasserstein distance between two signal distributions, each signal distribution being defined as a finite set of sub-signal distributions, and the Wasserstein distance being calculated between each set of sub-signal distributions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples that may be used to design new physical layer interfaces for communications systems, and particularly for new air interfaces for wireless communications. Examples described herein may help to enable measurement of distance between two signal distributions in a signal space, including in higher dimensional signal spaces. The disclosed approach for distance measurement may enable a more global distance measurement, which may be more reflective of the deployment environment.

Figure 1:
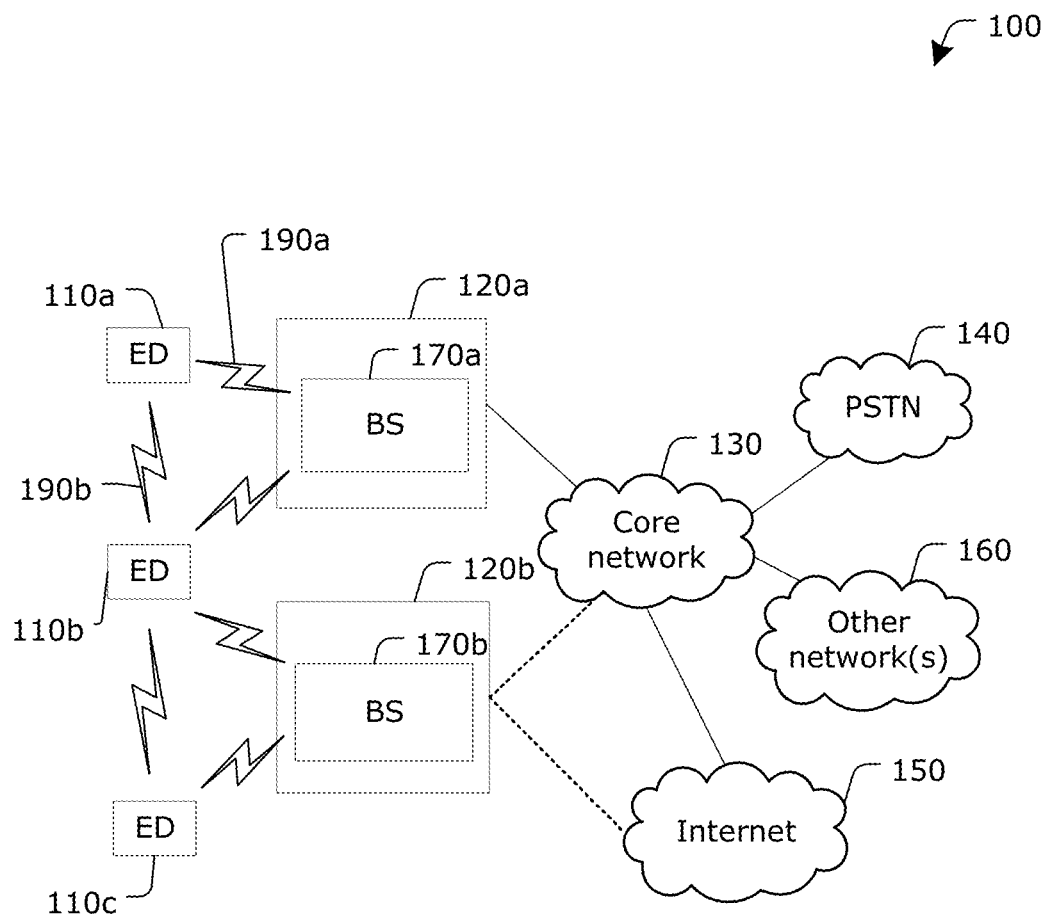
FIG. 1 is a schematic diagram of an example communication system suitable for implementing examples described herein.

To assist in understanding the present disclosure, an example wireless communication system is now described with reference to FIG. 1. FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology (e.g., 6G or later). In some examples, the wireless system 100 may also accommodate some legacy wireless technology (e.g., 3G or 4G wireless technology).

In the example shown, the wireless system 100 includes electronic devices (ED) 110a-110c (generically referred to as ED 110), radio access networks (RANs) 120a-120b (generically referred to as RAN 120), a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities. Future generation EDs 110 may be referred to using other terms.

In FIG. 1, the RANs 120 include base stations (BSs) 170a-170b (generically referred to as BS 170), respectively. Each BS 170 is configured to wirelessly interface with one or more of the EDs 110 to enable access to any other BS 170, the core network 130, the PSTN 140, the internet 150, and/or the other networks 160. For example, the BS 170s may include (or be) one or more of several well-known devices, such as a base transceiver station (BTS), a radio base station, a Node-B (NodeB), an evolved NodeB (eNodeB), a Home eNodeB, a gNodeB (sometimes called a next-generation Node B), a transmission point (TP), a transmit and receive point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. The wireless system 100 may include RANs, such as RAN 120b, wherein the corresponding BS 170b accesses the core network 130 via the internet 150, as shown.

The EDs 110 and BSs 170 are examples of communication equipment that can be configured to implement some or all of the functionality and/or embodiments described herein. In the embodiment shown in FIG. 1, the BS 170a forms part of the RAN 120a, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BS 170b forms part of the RAN 120b, which may include other BSs, elements, and/or devices. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more air interfaces 190a using wireless communication links (e.g. radio frequency (RF), microwave, infrared (IR), etc.). The EDs 110 may also communicate directly with one another via one or more sidelink air interfaces 190b. The interfaces 190a and 190b may be generally referred to as air interfaces 190. The present disclosure may apply to BS-ED communications over interfaces 190a as well as ED-ED communications over interfaces 190b. For example, examples of the distance metric disclosed herein may be used to measure the distance between two signal distributions over uplink (UL) and/or downlink (DL) BS-ED interfaces 190a, and may also be used to measure the distance between two signal distributions over sidelink ED-ED interfaces 190b. The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190. In accordance with examples described herein, the air interfaces 190 may utilize other higher dimension signal spaces, which may involve a combine of orthogonal and/or non-orthogonal dimensions. Using examples described herein, a new access technology for the air interfaces 190 may be implemented, in addition to or in place of the channel access methods mentioned above.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110 may be multimode devices capable of operation according to multiple radio access technologies, and incorporate multiple transceivers necessary to support such.

Figure 2:
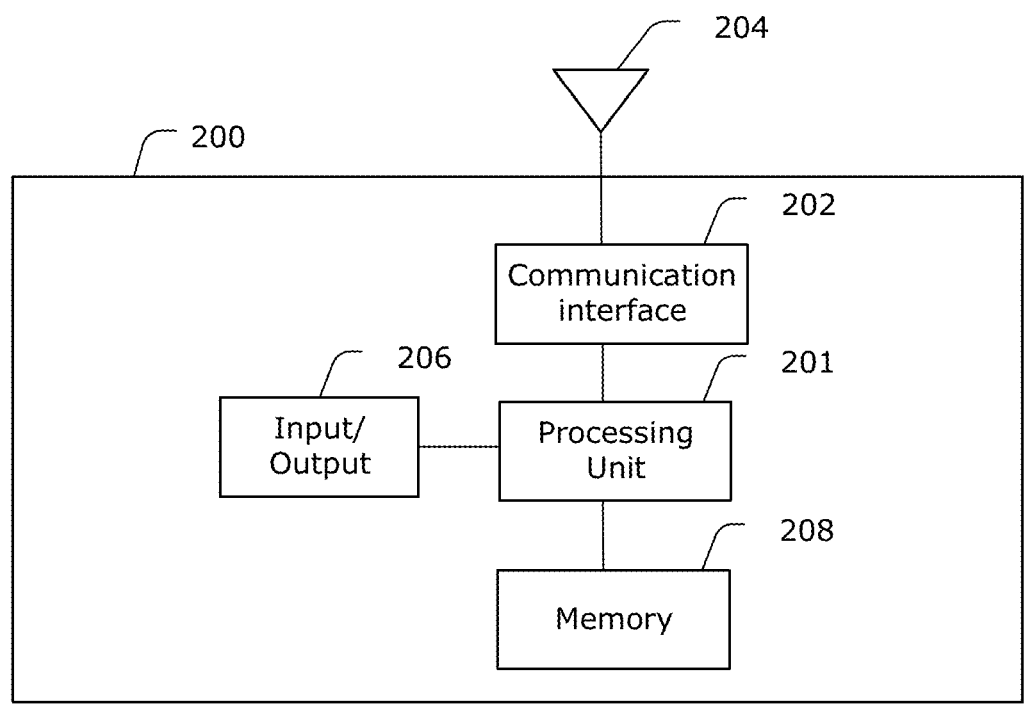
FIGS. 2 and 3 are block diagrams showing an example computing unit and an example base station/electronic device, respectively, suitable for implementing examples described herein.
Figure 3:
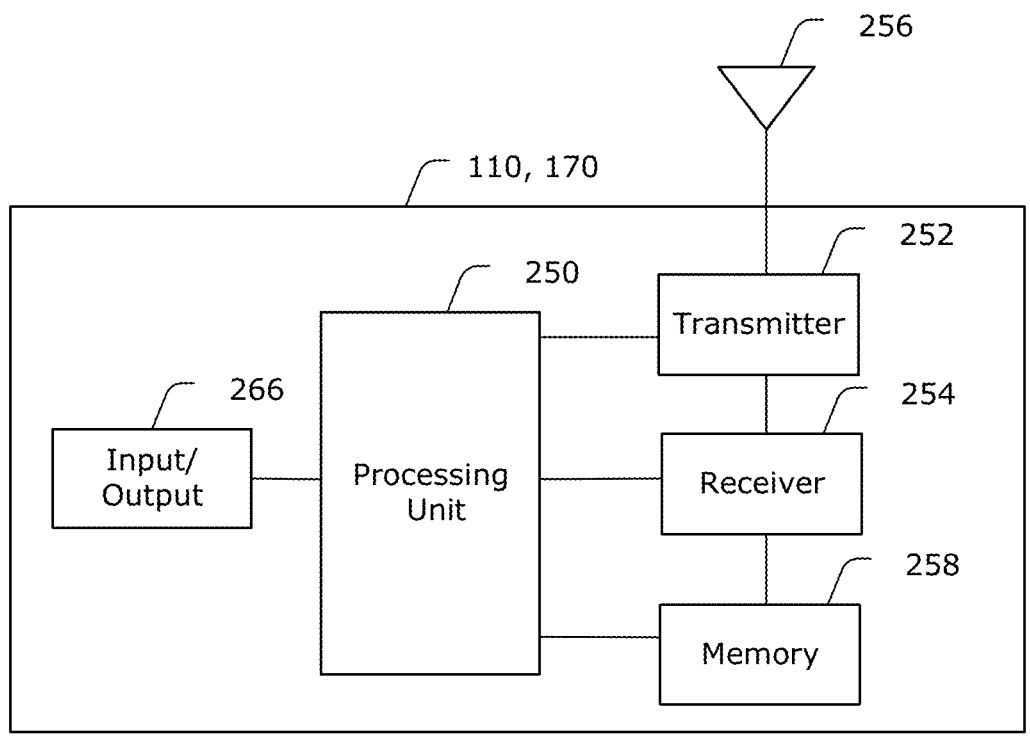

FIGS. 2 and 3 illustrate example devices that may implement the methods and teachings according to this disclosure. In particular, FIG. 2 illustrates an example computing unit (e.g., server or data center) 200, and FIG. 3 illustrates an example BS 170 or ED 110. These components could be used in the wireless system 100 or in any other suitable system.

As shown in FIG. 2, the computing unit 200 includes at least one processing unit 201. The processing unit 201 implements various processing operations of the computing unit 200. For example, the processing unit 201 could perform signal coding, data processing, power control, input/output processing, or any other functionality of the computing unit 200. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The computing unit 200 also includes at least one communication interface 202 for wired and/or wireless communications. Each communication interface 202 includes any suitable structure for generating signals for wireless or wired transmission and/or processing signals received wirelessly or by wire. The computer unit 200 in this example includes at least one antenna 204 (in other examples, the antenna 204 may be omitted). Each antenna 204 includes any suitable structure for transmitting and/or receiving wireless or wired signals. One or multiple communication interfaces 202 could be used in the computing unit 200. One or multiple antennas 204 could be used in the computing unit 200. In some examples, one or more antennas 204 may be an antenna array 204, which may be used to perform beamforming and beam steering operations. Although shown as a single functional unit, a computing unit 200 could also be implemented using at least one transmitter interface and at least one separate receiver interface.

The computing unit 200 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the computing unit 200 includes at least one memory 208. The memory 208 stores instructions and data used, generated, or collected by the computing unit 200. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the ED 110 or BS 170 includes at least one processing unit 250, at least one transmitter 252, at least one receiver 254, one or more antennas 256, at least one memory 258, and one or more input/output devices or interfaces 266. The processing unit 250 implements various processing operations of the ED 110 or base station 170, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the ED 110 or base station 170. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

As mentioned above, the example system 100 of FIG. 1 may be used for wireless communications using existing or future wireless technologies. Examples disclosed herein may provide an approach that would be suitable for development of future wireless technologies, and that may also be useful for current wireless technologies. To assist in appreciating the usefulness of the disclosed approach, the existing Shannon-based approach is first discussed.

Many existing wireless technologies have been developed based on the Shannon-defined metric (namely, mutual information or capacity) and a unified way to measure it. This Shannon-based approach uses the Shannon-Hartley theorem:

$$\text{Capacity} = B \cdot \log\left(1 + \frac{P}{N}\right)$$

where B, P, and N represent the occupied bandwidth, transmitted power, and channel white noise power respectively.

The Shannon-based mutual information metric may be interpreted as a measurement of the "distance" between any two signal distributions in the signal space. In the context of the present disclosure, it should be understood that a transmitted signal is received at a receiver as a likelihood distribution (which may be decoded at a probabilistic decoder in order to recover the transmitted information). The transmission thus should be understood as occupying an area in the signal space that corresponds to the likelihood distribution of the transmission. For simplicity, the term "signal distribution" is used in the present disclosure to refer to the likelihood distribution of a transmission. The mutual information metric and the corresponding measurement method (which is used to calculate the distance) rely on certain assumptions. One assumption is that B, the occupied bandwidth, represents an observation on the Fourier domain. This indicates the assumption that the mutual information metric should be observed both over time and frequency dimensions. Another assumption is that P/N, the signal-to-noise ratio (SNR), represents an observation with an assumed Gaussian distribution or sphere. This indicates the assumption that all the measurement should be done reliably with a Gaussian channel.

Thus far, almost all communications technologies (whether implemented in transmitter or receiver) have been developed to maximize the Shannon-based metric (i.e., channel capacity) on the basis of the time-frequency domain. Existing communications technologies may use techniques to remove other non-Gaussian factors (e.g., interferences), or to approximate them into a Gaussian assumption. Some wireless communications technologies that have been developed on this basis include techniques related to design of: waveforms, numerology, transmission time interval (TTI) duration, bandwidth, feedback measurement (e.g., channel quality indicator (CQI), pre-coding matrix indicator (PMI), rank indicator (RI)), reference signals, scheduler for resource allocation, granularity, and receiver alignment (e.g., synchronization). The Shannon-based metric has served as the basis for development of wireless technologies from 2G through to 5G, including technologies such as forward error correction (FEC), TDMA, FDMA, CDMA, orthogonal frequency-divisional multiplexing (OFDM), MIMO and proportional fair (PF) scheduling, among others.

However, the Shannon-based approach may be inadequate for development of future wireless technologies, such as new technologies for extending the signal space into higher dimensionality and/or including new non-orthogonal dimensions.

Although the Shannon-based metric was designed for the time-frequency domain, modern wireless systems (and expected future wireless systems) use signal spaces that contain more dimensions than only time and frequency.

Figure 4:
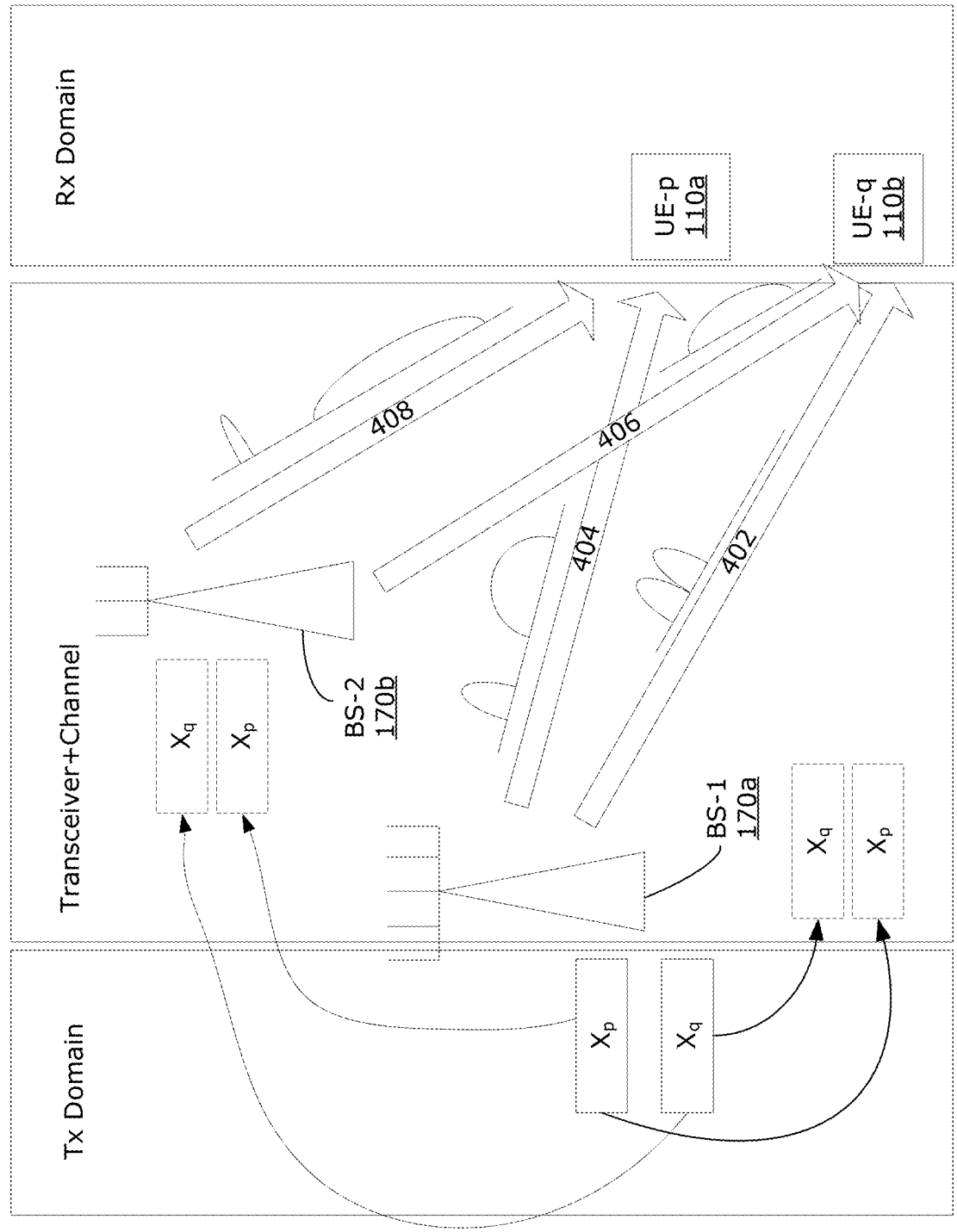
FIG. 4 is a schematic diagram illustrating how a transmitter and the transmission channel may be considered to play the role of a dimensional transformer between the transmitter domain and the receiver domain.

From the perspective of dimensionality, a transmitter and the transmission channel may be considered to play the role of a dimensional transformer. An example is shown in FIG. 4. In this example, there are two recipient EDs 110, namely UE-p 110a and UE-q 110b. There are also two transmitting BSs 170, namely BS-1 170a and BS-2 170b. Only two EDs 110 and two BSs 170 are shown for simplicity, however it should be understood that the following discussion may be applicable for any plurality of EDs 110 and BSs 170. In the example shown, each BS 170a, 170b has multiple antennas and BS-1 170a has more antennas than BS-2 170b. The BSs 170 and the EDs 110 are engaged in MIMO communications. Each BS 170a, 170b transmits one respective piece of information to each ED 110a, 110b over the air, and with different configurations. The source signal distributions have source distributions Xp and Xq in the transmitter domain, which are both transmitted by both BSs 170 (indicated by dashed boxes). During transmission, the signal distributions Xp and Xq are transformed by the transceiver and channel characteristics. As a visual aid, the distribution of the transmitted signal distributions are illustrated above arrows showing the transmissions. In the example shown, BS-1 170a transmits a signal distribution having a double-moon likelihood distribution in a lower band, over the MIMO channel #1 of UE-q 110b (indicated by arrow 402); BS-1 170a transmits a signal distribution having a distribution in a lower band and a likelihood distribution in a higher band, over the MIMO channel #1 of UE-p 110a (indicated by arrow 404); BS-2 170b transmits a signal distribution having likelihood distribution in a higher band, over the MIMO channel #2 of UE-q 110b (indicated by arrow 406); and BS-2 170b transmits a signal distribution having narrow likelihood distribution in a lower band and a wide distribution in a higher band, over the MIMO channel #2 of UE-p 110a (indicated by arrow 408). The different signal distributions are received at the respective BSs 110 in the receiver domain.

The result is a type of dimensional extension at the receiver side. For example, consider the transmission of signal distribution Xp. Xp is transmitted by both BS-1 170a and BS-2 170b; the transmitters at the two BSs form one dimension. At BS-1 170a, Xp is transmitted to UE-p 110a over two different bands (indicated by arrow 404). At BS-2 170b, Xp is transmitted to UE-p 110a over another two different bands (indicated by arrow 408), with different distribution shapes. The different bands form another dimension. At UE-p 110a, Xp is received as the total of the four different distributions over the different bands. In this way, Xp is extended to a higher number of dimensions at the receiver side. In general, this kind of dimensional extension may provide desirable dimensional gain to help improve SNR and diversity gain over variant channel conditions. Many modern wireless technologies, such as MIMO, distributed MIMO, coordinated multipoint (CoMP), dual connection, carrier aggregation and the like, have been developed using this basis. The intention is that two pieces of information intended for two different recipients can be well separated (e.g., interference-free) from each other at the receiver of each targeted recipient, by using appropriate selection of transmission configurations (that is, different dimensional extensions).

Figure 5:
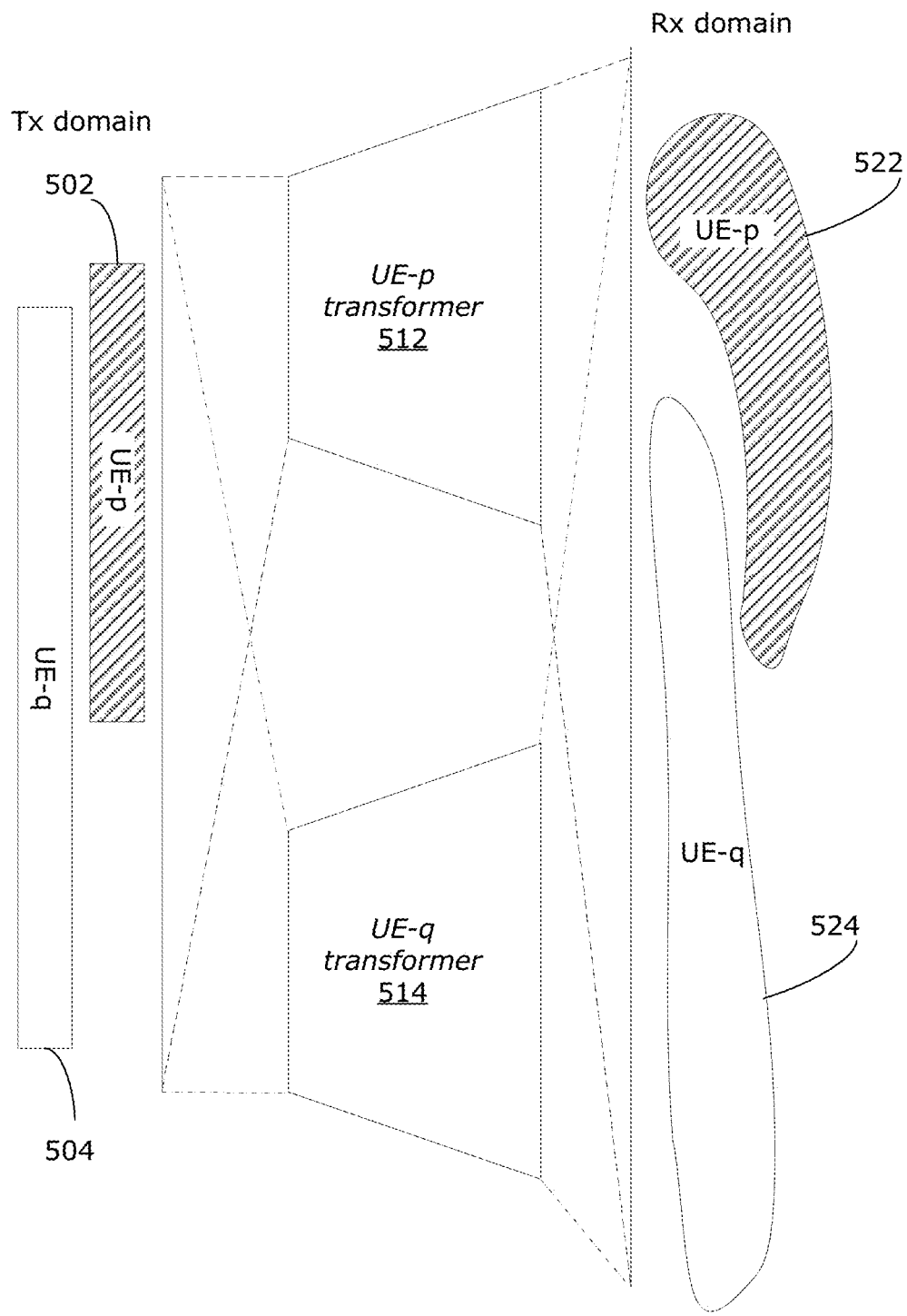
FIG. 5 is a diagram that further illustrates the dimensional extension that may be performed by the transmitter and the transmission channel.
Figure 6A:
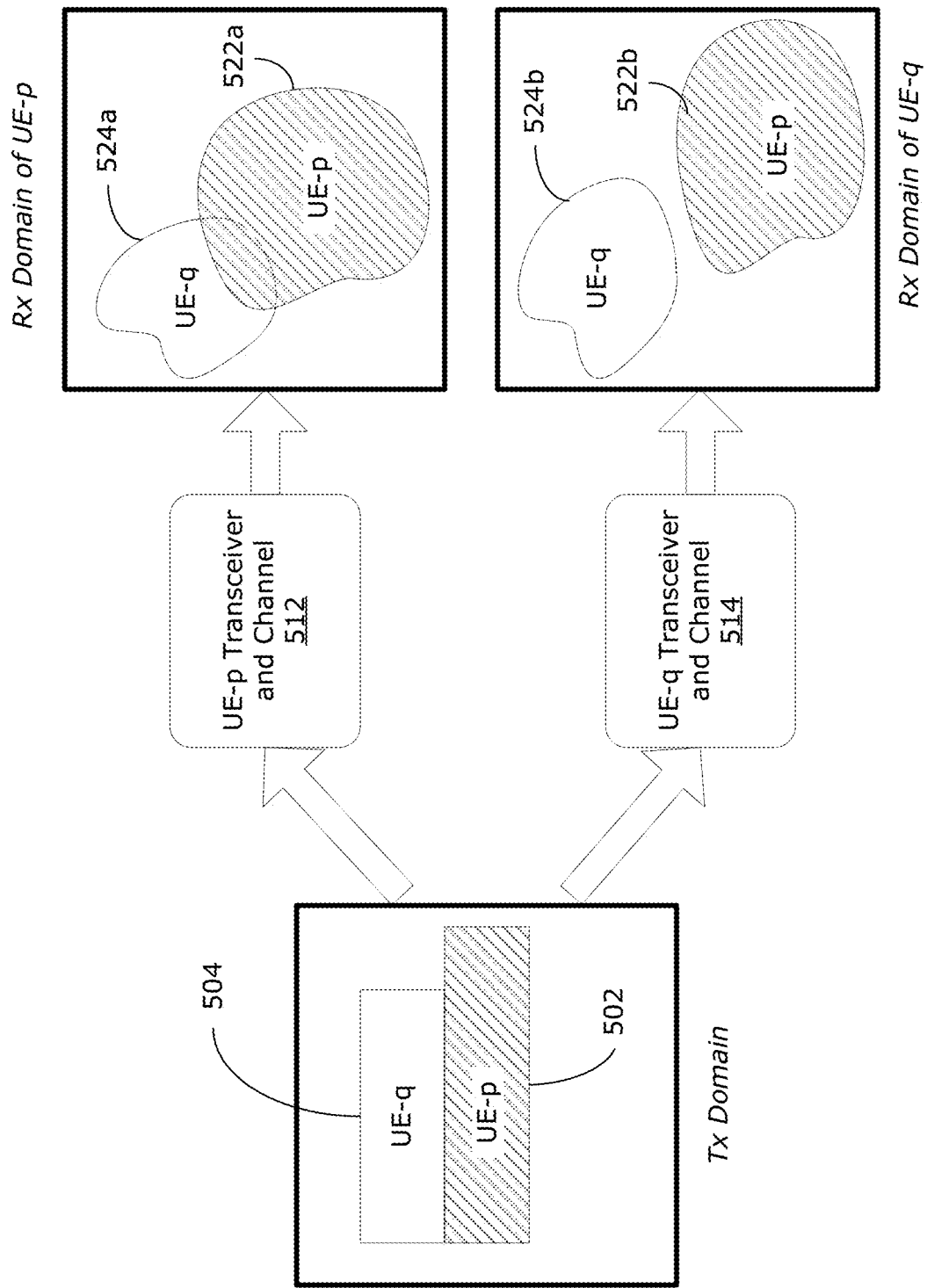
FIGS. 6A-6C illustrate three basic cases for how two transformers affect the signal distributions for two multiplexed recipients.
Figure 6B:
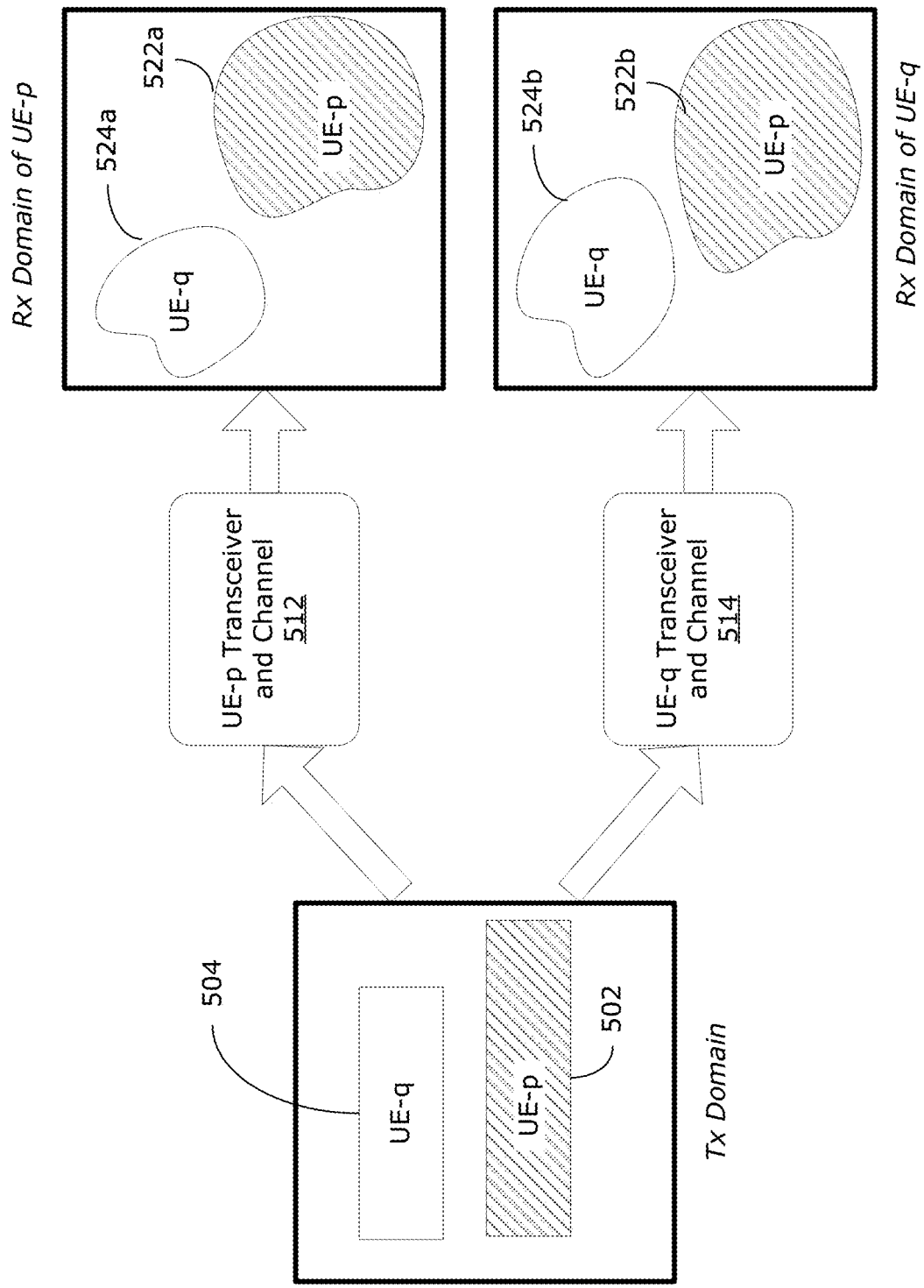
Figure 6C:
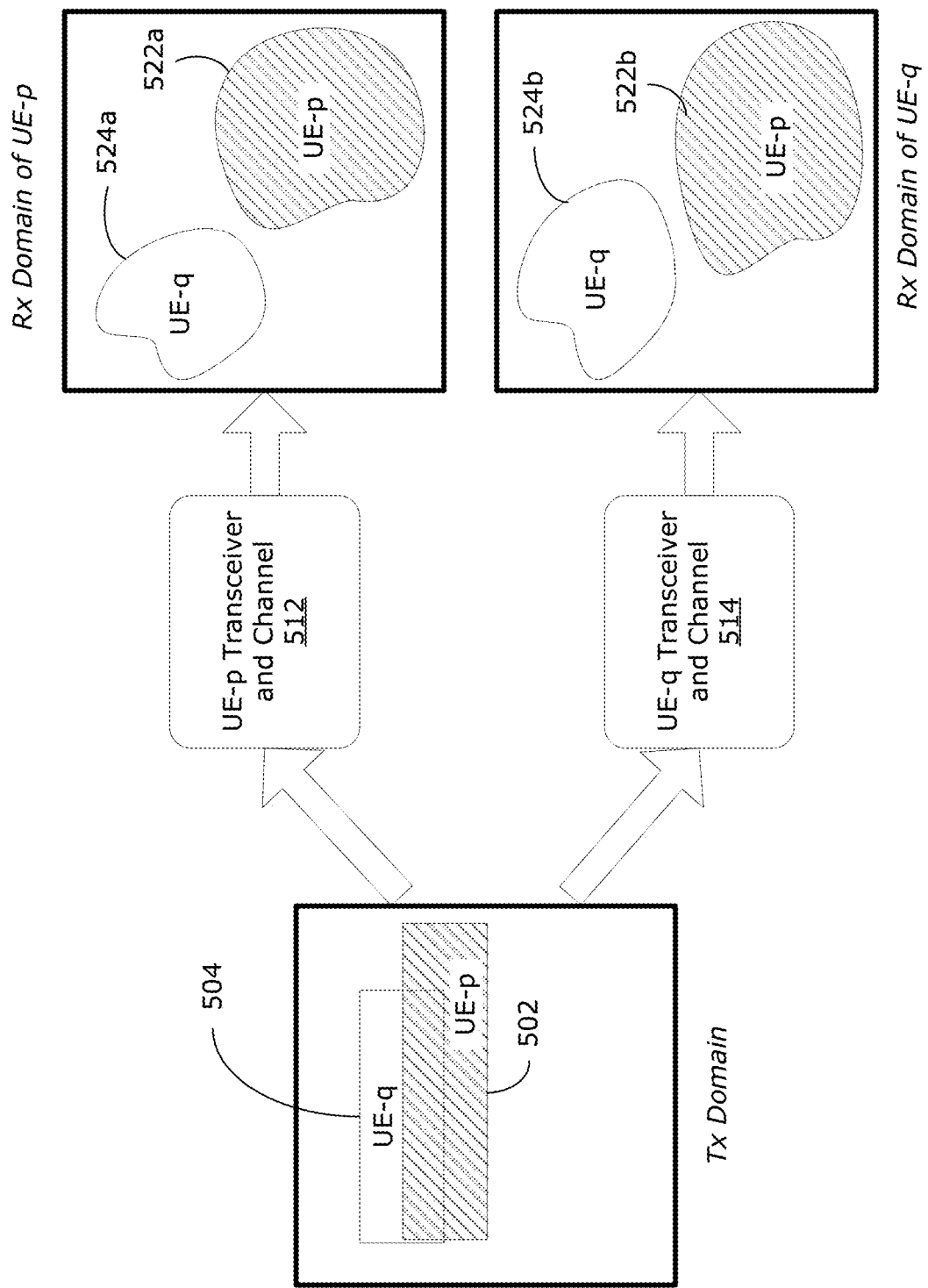

FIG. 5 is a diagram that illustrates this concept of dimensional extension over the transceivers. In FIG. 5, two source signal distributions intended for UE-p and UE-q have source distributions 502 and 504, respectively, in the transmitter domain. Conceptually, the transmitter (e.g., transceiver at a BS 170) and the transmission channel may be modeled as a recipient-specific transformer. Accordingly, transmission of the signal distributions may be modeled as passing the source distributions 502, 504 through respective UE-p transformer 512 and UE-q transformer 514. The transformers 512, 514 extend the source distributions 502, 504 into higher dimensions, transforming the source distributions 502, 504 into respective received distributions 522, 524 in the receiver domain. For simplicity, FIG. 5 illustrates the transformation of source distribution 502 by only the transformer 512, and the transformation of source distribution 504 by only the transformer 514. It should be understood that each transformer 512, 514 may actually be applied to both source distributions 502, 504, as illustrated in FIGS. 6A-6C and discussed further below. Generally, the transmitter and channel together may act as a recipient-specific transformer that transforms a source signal distribution from the transmitter domain (having a first dimensionality) to the receiver domain (having a second dimensionality, typically higher than the first dimensionality). For ease of reference, the term "transformer" is used herein to describe the effect of the transmitter and transmission channel together on the likelihood distribution of a transmitted signal.

To achieve dimensional gain and diversity gain, there may be more than one such transformer coexisting in a wireless system. For simplicity, the following discussion will be in the context of two recipient EDs. However, it should be understood that there can be any number of multiplexed EDs.

FIGS. 6A-6C illustrate three basic cases for how two transformers affect the signal distributions for two multiplexed recipients. In all of the cases shown and discussed below, there are two source signal distributions having source distributions 502, 504 in the transmitter domain and intended for UE-p and UE-q, respectively. The source distributions 502, 504 are transformed by respective transceiver and channel characteristics (modeled together as transformers 512, 514), and received in the receiver domain of UE-p and the receiver domain of UE-q. The source distributions 502, 504 are transformed into received distributions 522a, 524a in the receiver domain of UE-p; and the source distributions 502, 504 are transformed into received distributions 522b, 524b in the receiver domain of UE-q. Notably, the received distributions 522a, 524a in the receiver domain of UE-p may be different from the received distributions 522b, 524b in the receiver domain of UE-q.

FIG. 6A illustrates a first scenario in which the source signal distributions 502, 504 are non-overlapping (e.g., orthogonal, or non-intersection in geometrical terms) in the transmitter domain. The transformer 512 for UE-p results in the received signal distributions 522a, 524a to be overlapping (e.g., having interference) in the receiver domain for UE-p. The transformer 514 for UE-q results in the received signal distributions 522b, 524b to be non-overlapping (e.g., having no interference) in the receiver domain for UE-q. Generally, FIG. 6A illustrates the scenario where interference-free signal distributions in the transmitter domain is transformed into mutually-interfering signal distributions in at least one receiver domain. This is undesirable.

FIG. 6B illustrates a second scenario in which the source signal distributions 502, 504 are non-overlapping (e.g., orthogonal) in the transmitter domain. The transformer 512 for UE-p results in the received signal distributions 522a, 524a to be non-overlapping (e.g., having no interference) in the receiver domain for UE-p. The transformer 514 for UE-q results in the received signal distributions 522b, 524b to also be non-overlapping (e.g., having no interference) in the receiver domain for UE-q. This is considered a normal scenario. However, there is no diversity gain achieved.

FIG. 6C illustrates a third scenario in which the source signal distributions 502, 504 are overlapping (e.g., non-orthogonal) in the transmitter domain. The transformer 512 for UE-p results in the received signal distributions 522a, 524a to be non-overlapping (e.g., having no interference) in the receiver domain for UE-p. The 514 for UE-q results in the received signal distributions 522b, 524b to also be non-overlapping (e.g., having no interference) in the receiver domain for UE-q. Thus, the transformers 512, 514 in FIG. 6C serves to transform mutually-interfering signal distributions 502, 504 in the transmitter domain into interference-free signal distributions 522, 524 in all receiver domains. This is considered a desirable result, and in particular diversity gain is achieved.

Generally, it would be desirable to design a transmitter such that more of the third scenario (illustrated by FIG. 6C) is achieved and fewer of the first scenario (illustrated by FIG. 6A). In order to design a transmitter to achieve this goal, it would be helpful to have a distance metric that may be used to measure the distance between two signal distributions in all receiver domains.

Conventionally, the Shannon metric and its measurement have been used. Based on the Shannon metric, existing approaches for transmitter design have used an algebraic way to control and configure the transformers' parameters, with the goal of minimizing interference between the multiplexed signal distributions in the receiver domain. A number of parameters are required during configuration. For example, L1 (physical layer) defines the transmitter architecture, for example requiring a finite set of modulation and coding schemes (MCSs) and coding rates, a finite set of frame structures, and a finite set of carrier aggregation and dual connections. L1 scheduler configures the coefficients for transmitter and receiver, for example requiring a finite set of MCS tables, a finite set of precoding matrix and power control, and a finite set of numerology (including number of antennas, number of carrier aggregation, L1 duration, OFDM size). L1 informs the receiver of the coefficients and architectures, for example requiring a finite set of DL physical downlink control channel (PDCCH) formats. The transmitter must also obtain channel conditions, which may require a finite set of reference signals and pattern, certain pre-defined measurement parameters (e.g., CQI, PMI, RI), UL/DL reciprocal communications, and a finite set of UL physical uplink control channel (PUCCH) formats.

Because the channel environment is varying and EDs may be mobile, a transmitter may need to adjust the transmitter (and receiver) in response to these changes, in order to minimize the interference on the receiver side. Therefore, a transmitter may be required to monitor the channel condition, which may be reported by the receiver on a regular (e.g., orthogonal) or irregular (e.g., non-orthogonal) basis. Various standardized methods are used to enable the transmitter to obtain the required information about channel conditions. When the transmitter determines that changes are required to the transceiver, there is a large number of options to consider for a high dimensional space. Typically, a wireless standard defines a sub-set of these options (e.g., as tables, index, formula, etc.) that are agreed on by both transmitter and receiver. Instead of having to choose one from among a large number of possible options, the transmitter may instead make a selection from this specified finite set of options and inform the receiver of the selection.

As dimensionality of the signal space is increased (meaning that the "true" environment through which a signal is transmitted is becoming more and more complicated), the sub-set of these options defined for a transceiver must be increased accordingly. This increases the amount of measurement information and control information required, and may result in overloading of the entire system. This problem arises because, conventionally, the only metric available is the Shannon metric, meaning that every measurement must be converted into a measurement in the frequency and time domain (to be compatible with the Shannon metric) and then a selection is made on this basis. This is complex and resource-intensive. Further, the Shannon metric may not be reflective of the complexity of the true environment.

Despite these shortcomings of the Shannon metric, in general, a distance metric is still important for proper transmitter design. For example, consider a transmitter that transmits two multiplexed signal distributions having respective source distributions Xp and Xq in the transmitter domain, intended for two respective recipients UE-p and UE-q. During transmission, different copies of Xp and Xq are subjected to different paths with various delays, attenuations and distortions (which may be linear or non-linear). These copies reach one receiver asynchronously or synchronously to converge into received signal distributions Yp and Yq in the receiver domain. A distance metric is used to design the transmitter to ensure sufficient distance between Yp and Yq in receiver domains for both recipients.

However, there are challenges to be addressed. For example, natural channels are different and varying. Such channel changes include environmental changes (which may be relatively large- or medium-scale changes) and stochastic changes (which may be relatively small-scale changes). If new dimensions are introduced (e.g., for dimensional and diversity gain), significant changes (e.g., introduction of new antenna ports, secondary bands, secondary transmitters, etc.) need to be taken into account. The environments experienced by different channels may be very different in reality.

Figure 7:
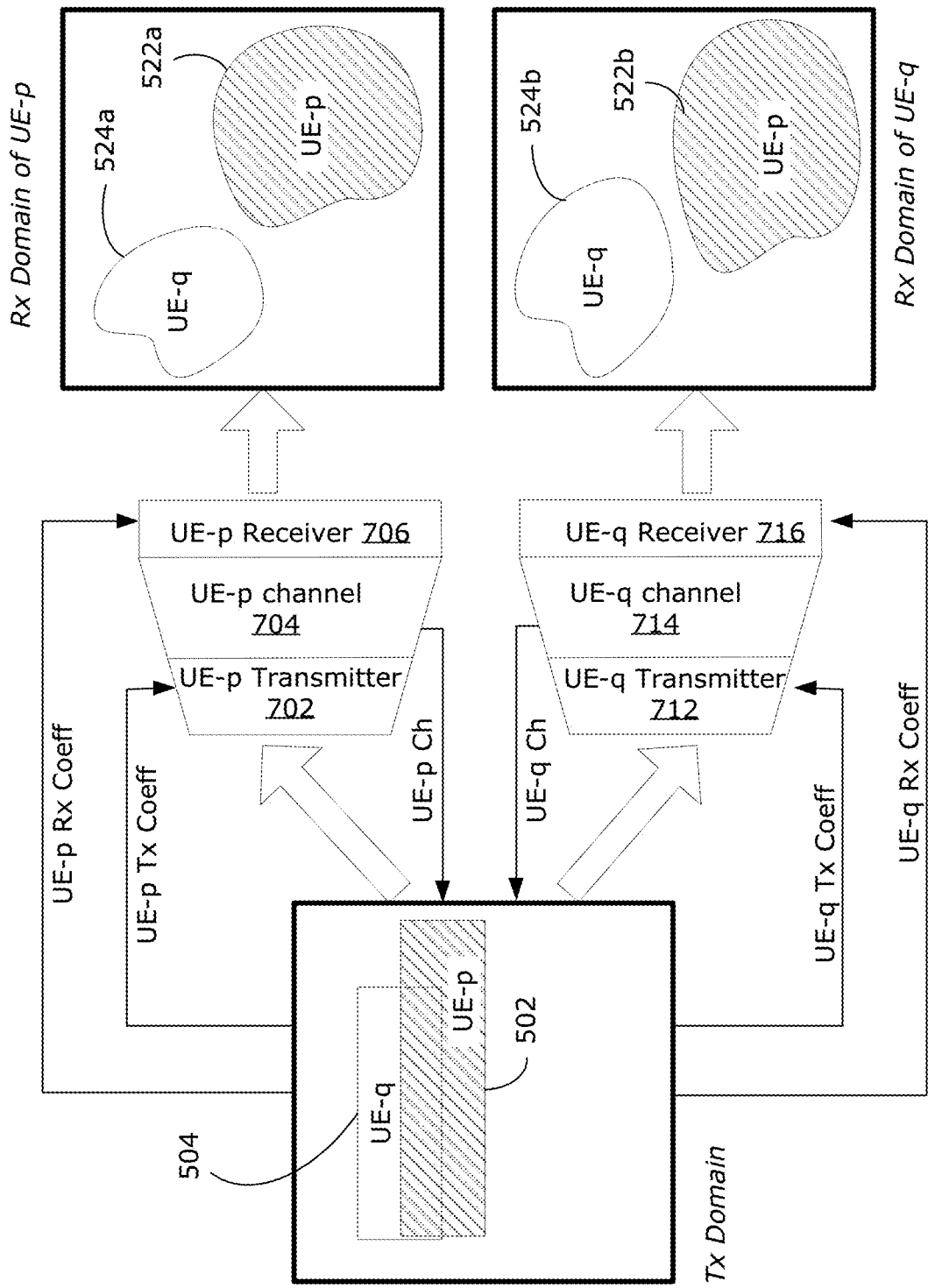
FIG. 7 is a schematic diagram that illustrates some of the complexity that might need to be considered when considering signal separation at a receiver.

FIG. 7 illustrates some of the complexity that might need to be considered. FIG. 7 is similar to FIG. 6C, however the characteristics of the transceiver and channel 512, 514 have been divided out. Specifically, the UE-p transceiver and channel (which was previously modeled as a single transformer 512) may be divided out into UE-p transmitter 702, UE-p channel 704 and UE-p receiver 706 characteristics. Similarly, the UE-q transceiver and channel (which was previously modeled as a single transformer 514) may be divided out into UE-q transmitter 712, UE-q channel 714 and UE-q receiver 716 characteristics. Each of these components may present its own effects on the resulting signal distributions received at the receiver domain. As shown in FIG. 7, various parameters and factors (e.g., received coefficients, transmitter coefficients and channel changes) may each impact the resulting signal distributions received at the receiver domain. For example, the UE-p transmission coefficients (indicated in FIG. 7 as UE-p Tx Coeff) may contain information about MCS, number of sub-carriers, number of antennas, frame length etc. for the UE-p transmitter 702. The UE-p receiver coefficients (indicated in FIG. 7 as UE-p Rx Coeff) contains similar information but for the UE-p receiver 706. The UE-p transmitter 702 may send the UE-p receiver coefficients to the UE-p receiver 706 (e.g., via a control channel or other independent channels) before the UE-p transmission coefficients are implemented. The UE-p channel coefficients (indicated in FIG. 7 as UE-p Ch) represent the UE-p channel 704 from the UE-p transmitter 702 to the UE-p. The UE-p channel coefficients can be estimated by the UE-p and fed back to the UE-p transmitter 702 via a reverse channel, for example. Or the UE-p transmitter 702 may itself derive the UE-p channel coefficients from the downlink channel by reciprocity, for example. The UE-q Tx Coeff, UE-q Rx Coeff and UE-q Ch indicated in FIG. 7 may be similarly understood. It should be understood that FIG. 7 illustrates a model of the system, and may not be reflective of actual implementation. The UE-p and UE-q transmitters 702, 712 may be implemented in one transmitter of the transmitting device (e.g., a BS) in actual implementation, and the UE-p receiver 706 and the UE-q receiver 716 may be implemented as respective receivers of respective receiving devices (e.g., respective UE-p and UE-q EDs) in actual implementation, for example.

Any significant change on the dimensional level would also significantly change the likelihood distribution of signals. In essence, the nature of the distance metric is different among the likelihood distributions of the received signals on all the receivers. For example, distance metrics in macro-cell and small-cell communications are different, and also distance metrics in narrow-band cell and wide-band cell communications are different.

In existing Shannon-based approaches, this problem is solved by using assumptions to simplify the true environment. For example, prior to setting the 5G specification, a discussion about possible 5G channel models had been firstly conducted and concluded, and the possible environments for 5G had been classified into different scenarios such as enhanced mobile broadband (eMBB), ultra-reliable low-latency communication (uRLLC), massive machine type communications (mMTC), small-cell, and macro-cell. By assuming a certain environment for certain types of communications, different parties could work together to evaluate candidate technologies on the same simulation assumptions. However, the reliance on an assumed environment limited the flexibility and potential to represent a true environment. The drawback is that if a new environment was added (e.g., a new physical environment or new application traffic) a complete standardization procedure should be required to evaluate and then specify the technologies.

Accordingly, in order to increase the dimensionality, a new fundamental dimension needs to be constructed or created that must be orthogonal to the existent ones (e.g., time and frequency are basic fundamental dimensions in existing wireless technologies). The new fundamental dimension must be agreed upon and implemented by the entire wireless system. For example, this created or constructed fundamental dimension would need to be well described in a standard so all parties involved in the wireless system is able to configure transceivers to align to the new fundamental dimension.

Figure 8A:
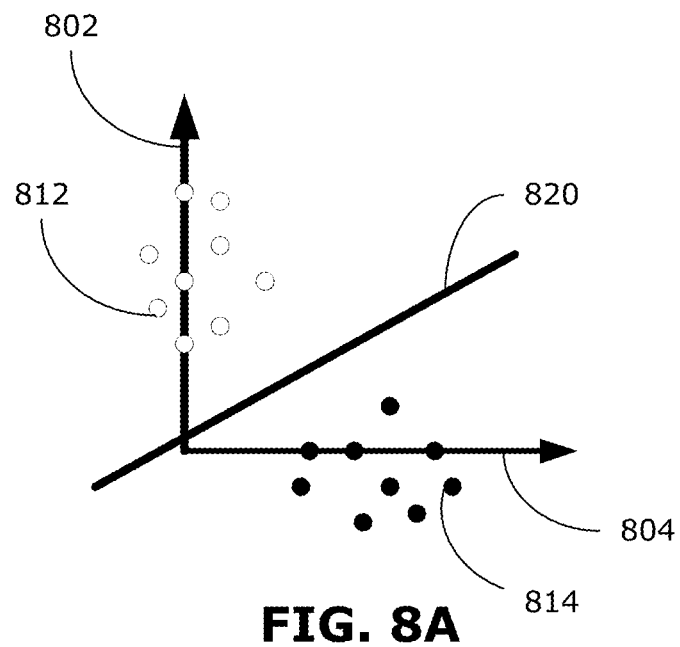
FIGS. 8A and 8B are representations of two orthogonal dimensions, and two non-orthogonal dimensions, respectively, and how transmitted signal distributions along those dimensions may be separated.

Generally, if the orthogonality between fundamental dimensions could tolerate channel distortion, multiple users can continue to be added. FIG. 8A is a geometrical representation of two orthogonal dimensions 802, 804. Plotted along the two dimensions 802, 804 are representations of received signal distributions 812, 814 subjected to the transmission channel. The signal distributions 812, 814 may be subjected to channel distortions, which result in the signal distributions 812, 814 being shifted off the axes of the dimensions 802, 804. The receiver aims to separate the two dimensions 802, 804, represented by a line 820 in FIG. 8A. Therefore, the wireless system aims to keep orthogonality of the dimensions at a receiver, against time-varying channel distortions. Various wireless technologies have been designed to guarantee or maintain dimensional orthogonality using many different techniques, such as reference signals, measurement, feedback, and complex scheduling algorithms. Generally, the more fundamental dimensions a wireless system uses, the more such reference signals and their measurements/feedbacks are needed to ensure orthogonality.

It should be understood that it is not a trivial task to add a new fundamental dimension into an existing wireless system. Technically, it is generally difficult to find a well-orthogonal fundamental dimension. Further, it may be difficult to reach consensus on a new fundamental dimension, when there are many parties involved.

In order to further improve the system capacity, the wireless system has evolved into defining new fundamental dimensions that need not be fully orthogonal to the existing dimensions for higher spectrum efficiency. After frequency, time, and code dimensions have been considered, it is generally hard to find another perfectly orthogonal fundamental dimension for a wireless signal. A compromise may be to consider fundamental dimensions that are conditionally orthogonal or non-orthogonal.

For non-orthogonal dimensions, if the residual orthogonality between non-orthogonal dimensions can "tolerate" expected channel distortions, those dimensions may still be valid for consideration as fundamental dimensions.

Figure 8B:
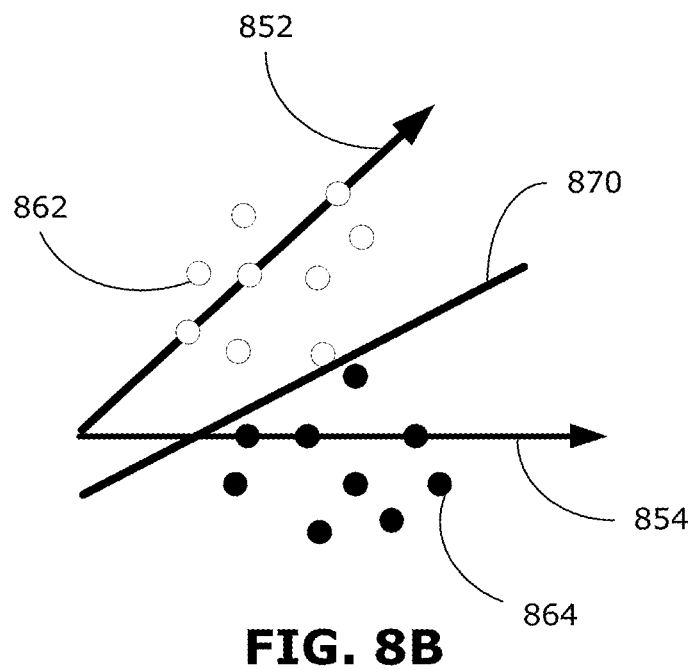

FIG. 8B is a geometrical representation of two non-orthogonal dimensions 852, 854. Plotted along the two dimensions 852, 854 are representations of received signal distributions 862, 864 subjected to the transmission channel.

The signal distributions 862, 864 may be subjected to channel distortions, which result in the signal distributions 862, 864 being shifted off the axes of the dimensions 852, 854. If the receiver is still able to separate the two dimensions 852, 854 (represented by a line 870 in FIG. 8B), then the dimensions 852, 854 may be valid for consideration as fundamental dimensions.

Some non-orthogonal fundamental dimensions that have been adapted by existing wireless systems include those used in non-orthogonal multiple access (NoMA) and multi-user MIMO (MU-MIMO), for example. Generally, the more fundamental dimensions that can be included into a wireless system, the more spectrum efficiency the wireless system can achieve.

In the examples illustrated in FIGS. 8A and 8B, the lines 820, 870 indicate a receiver could find a multi-dimensional hyperplane to divide two received noisy signal distributions from two users (one user on one dimension, the other on another dimension). An inability to divide the two noisy signal distributions may result in undesirable interference between the received signal distributions. The question then is how to evaluate whether the non-orthogonality of the dimensions is acceptable, specifically that expected channel distortions can be tolerated (i.e., the receiver can continue to separate the two dimensions). Conventional approaches to this problem have been based on the Shannon-metric, which uses a Gaussian sphere to evaluate.

Figure 9A:
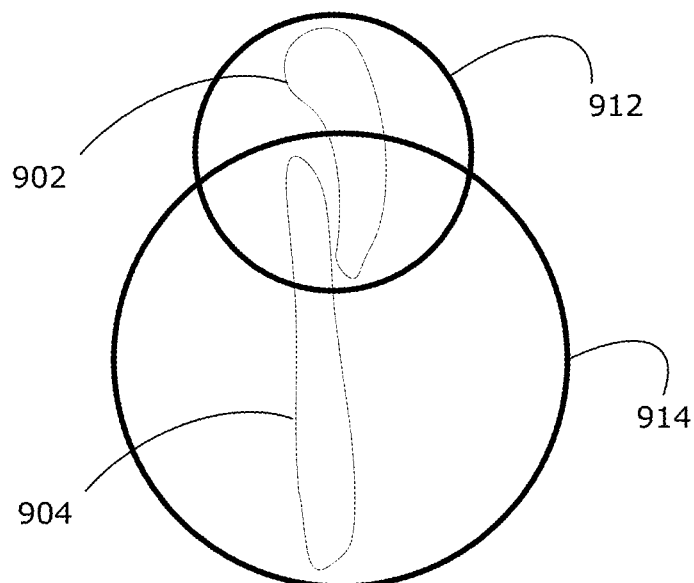
FIGS. 9A and 9B illustrate examples of how assumed Gaussian spheres have been conventionally used for evaluating whether two signal distributions are interfering with each other.
Figure 9B:
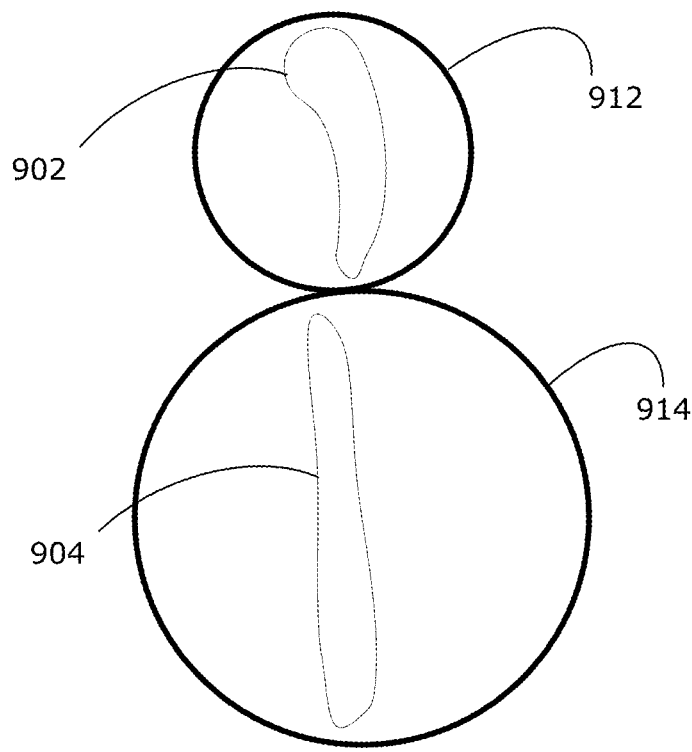

FIGS. 9A and 9B illustrate examples of how assumed Gaussian spheres have been conventionally used for evaluating whether two signal distributions are interfering with each other. FIGS. 9A and 9B represent two signal distributions 902, 904 in the receiver domain of a recipient. The Gaussian assumption is interpreted as a multi-dimensional sphere whose center is expectation of the signal distribution and radius is variance of the signal distribution. The Gaussian spheres for the signal distributions 902, 904 are represented as circles 912, 914, respectively, enclosing the respective signal distributions 902, 904. FIG. 9A shows an example where the signal distributions 902, 904 do not overlap (that is, do not interfere with each other) but because their assumed Gaussian spheres 912, 914 overlap, conventional wireless systems would consider there to be interference. In order for conventional wireless systems to consider there to be no interference, the signal distributions 902, 904 as well as their assumed Gaussian spheres 912, 914 would have to be non-overlapping, as illustrated in the example of FIG. 9B.

In 5G NR, nearly all receiver measurements are concerned about the (co)variance of signal distributions (i.e., the radius of assumed Gaussian sphere). For example, the measurements CQI, PMI, and RI are all related to singular value decomposition (SVD) of the channel matrix $H \cdot H^H$. Conventionally, it is very important for a transmitter to know the radius of the Gaussian spheres that a receiver would observe and then to adjust the transmission parameters. For example, based on the reported measurements, the power controlling mechanism at the transmitter has been a way to adjust the distance between assumed Gaussian spheres. However, the higher the number of dimensions, the less efficient Gaussian spheres are. In a high-dimensional wireless system (e.g., more than three dimensions), it becomes increasingly difficult (almost an NP problem) to calculate the Gaussian sphere.

The present disclosure provides a distance metric for measuring the distance between two signal distributions (e.g., in the receiver domain), which is more relevant to the true environment. For example, the disclosed distance metric may be more reflective of the type of signal traffic being transmitted over the channel, and how different types of physical environments affect the channel. Further, the disclosed distance metric may enable wireless technologies to be developed that do not need to rely on the Gaussian assumption. A machine-learning algorithm, such as a deep neural network (DNN) may be used for implementation.

Figure 9C:
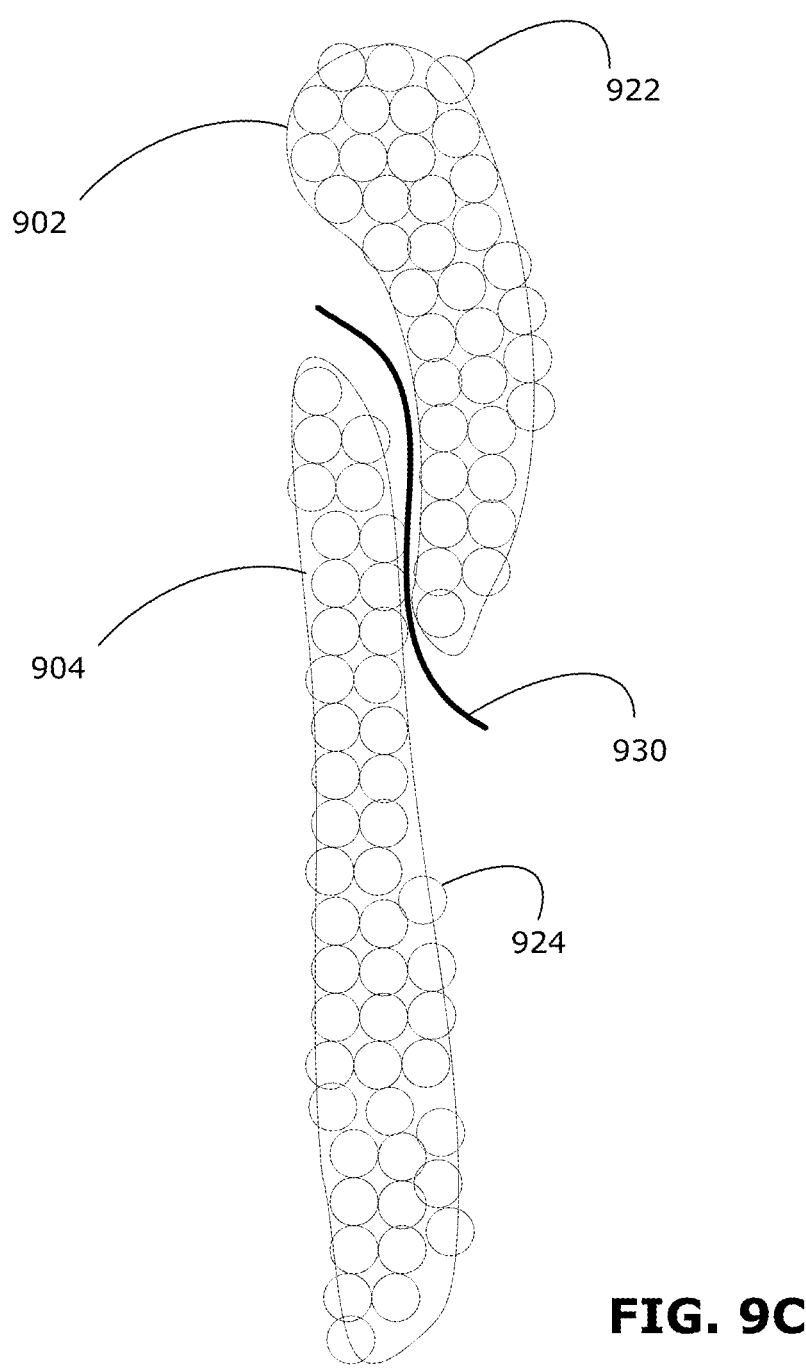
FIG. 9C illustrate an example of how the disclosed approach for measuring signal separation may enable more precise measurement of signal separation.

Using a DNN, a signal distribution can be regarded as a manifold in a high dimensional space. FIG. 9C again shows the signal distributions 902, 904 discussed above with respect to FIG. 9A. However, using the DNN-based approach, each signal distribution 902, 904 is divided into a respective set of small subspaces. The Gaussian assumption is applied on each subspace, to generate respective sets of small Gaussian spheres 922, 924. On each small Gaussian sphere, the Shannon-metric can be applied.

Measurement of mutual information (related to amount of overlap) between the two signal distributions 902, 904 may be represented as a binary classification problem to distinguish between the two signal distributions 902, 904. A binary classification problem can be solved by DNN-based training. Once the DNN is trained (i.e., converges), the DNN itself (represented by weighting coefficients and architecture) represents a hyper-plane (illustrated by line 930 in FIG. 9C) to divide the two signal distributions 902, 904. An example of such a DNN-based approach for measuring mutual information has been described in U.S. provisional patent application No. 62/826,034, filed Mar. 29, 2019 entitled "A METHOD AND APPARATUS FOR GENERATE WAVEFORM BY POLARIZATION NETWORK(S)".

If a receiver can use such a DNN-based detector, the signal distribution of interest can be extracted. Further signal processing may be done as appropriate. It should be noted that this DNN-based approach is applicable for a signal distribution of any shape and in any dimensional space. In order to effectively implement such an approach, it would be useful to provide a distance metric that may provide a more effective measurement than mutual information.

Mutual information may be interpreted as a measurement of "interaction" between two signal distributions. If two signal distributions are overlapping in the signal space (i.e., there is signal interference) the mutual information is less than maximum and the value of the mutual information represents that amount of overlap. If two signal distributions do not overlap in the signal space (i.e., there is no interference), their mutual information reaches the maximum value. Notably, a pair of non-overlapping signal distributions that are close to each other in the signal space has the same mutual information (i.e., maximum value) as a pair of non-overlapping signal distributions that are far apart from each other in the signal space. A DNN-based detector that has been trained to provide a mutual information measurement can indicate if two signal distributions are non-overlapping, but cannot provide information about how far apart the two signal distributions are from each other. This lack of precision may hamper efforts to maximize use of a signal space. For example, without knowing exactly how far apart two non-overlapping signal distributions are, it becomes difficult if not impossible to efficiently arrange a third signal distribution between the two existing signal distributions.

Reliance on a Shannon-based metric may have disadvantages that become more acute with increasing dimensions. Although more dimensions may bring about more system gains, the gain depends on how to divide the signal space. Although new fundamental dimensions can be added to the signal space, it becomes challenging to measure signal distributions in higher dimensions. For example, in order to effectively perform UE-pairing and UE-grouping in MU-MIMO, many measurements must be communicated in feedback and reports. Because of the assumed Gaussian sphere, in many cases power control (controlling signal distribution variances or covariances) is relied upon to increase the distance between two signal distributions. This is based on a trial-and-error approach that typically is costly in terms of measurement and feedback.

The present disclosure describes a machine-learning-based approach for measuring the distance between two signal distributions. The disclosed distance metric may be used instead of the Shannon-based metric, for designing next generation and future wireless technologies for example. In examples described below, a system that implements a DNN may be trained to output a distance metric that measures the distance between two signal distributions in a signal space of any dimensionality (e.g., adapted to any environment).

Figure 10:
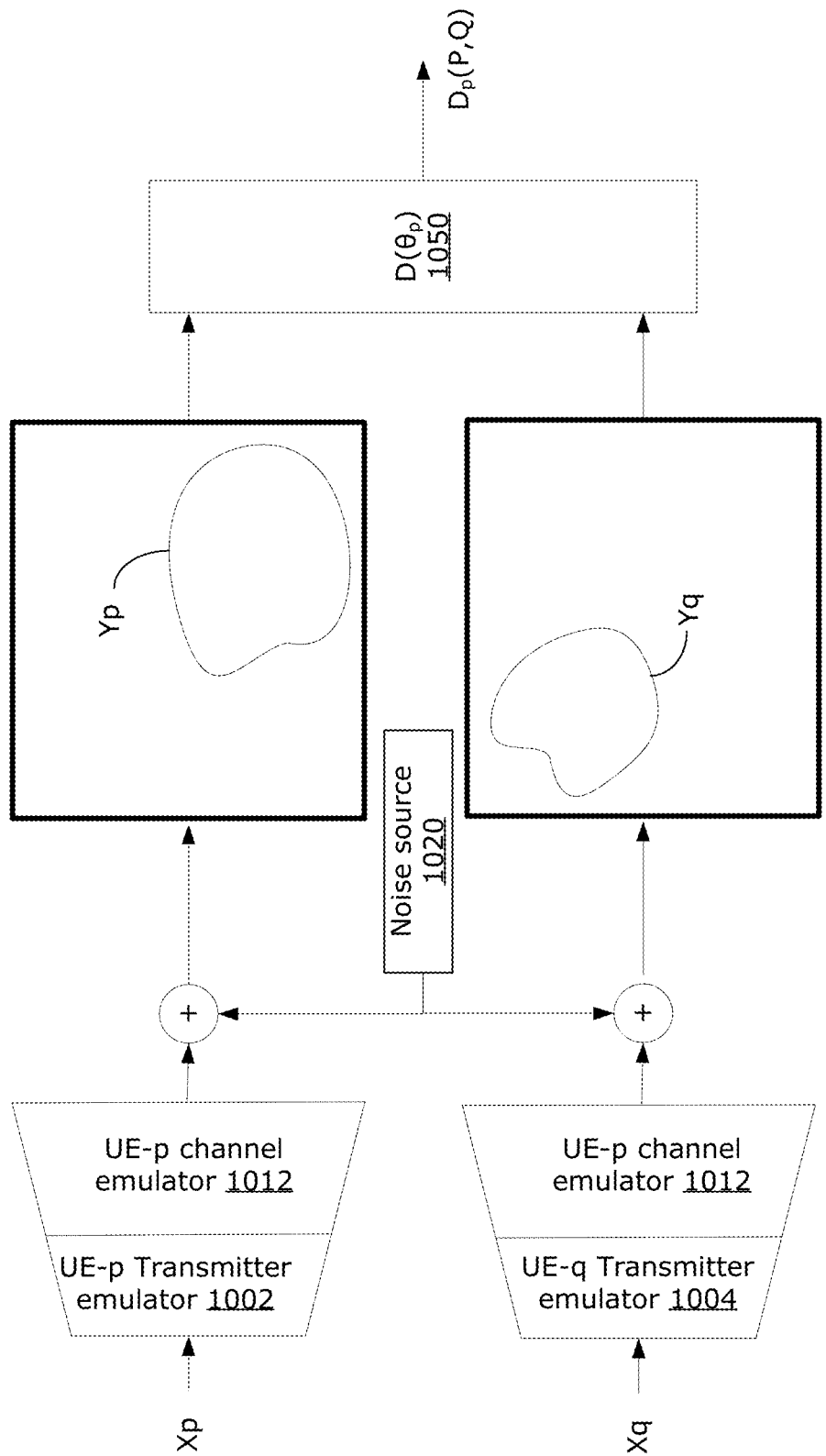
FIG. 10 is a schematic diagram illustrating an example implementation of a neural network-based system for measuring the distance between two signal distributions in a receiver domain.

FIG. 10 illustrates an example implementation of a DNN-based system for measuring the distance between two signal distributions. Such a system may be implemented in a transmitting apparatus (e.g., a BS) to enable tuning of transmissions to avoid interference at a receiving apparatus (e.g., an ED). Although described in some examples as being implemented at the transmitting apparatus, in other examples the disclosed DNN-based system may be implemented by another network entity (e.g., in the core network) and the output provided to the transmitting apparatus. In FIG. 10, emulators may be used to emulate the characteristics of various components, discussed below. The emulation and training according to the implementation of FIG. 10 may be performed at the transmitting apparatus, for example by a processing unit.

For discussion purposes, the system shown in FIG. 10 enables a distance measurement that is from the perspective of only one recipient device. Later discussion will describe an example DNN-based system that provides global distance measurement (i.e., not specific to the perspective of any one recipient). Consider the example where a transmitting apparatus seeks to transmit signal distributions having source distributions Xp and Xq recipient devices UE-p and UE-q. Before transmitting the signal distributions over the air, the transmitting apparatus may use the DNN-based system to determine whether the received signal distributions Yp and Yq that are expected to be received at the UE-p receiver are well separated from each other and how far they are separated from each other. By estimating the expected distance between received distributions Yp and Yq prior to actual transmission, the transmitter can be tuned (e.g., by appropriate adjustment of transmitter coefficients) for a desired amount of separation between Yp and Yq. The following discussion focuses on estimation of Yp and Yq for the UE-p receiver. Discussion that includes the UE-q receiver will follow.

In FIG. 10, it is assumed that parameters for the transmission channel are known (e.g., the transmitter has received measurements for the UE-p channel from UE-p). The transmission channel for UE-p may thus be represented by a UE-p channel emulator 1012. The transmission parameters for transmitting to UE-p and to UE-q are set by the transmitter itself and thus also known. These transmission parameters may be represented by UE-p transmitter emulator 1002 and UE-q transmitter emulator 1004. In some examples, instead of using emulators, the actual transmitter may be used (although it may be considered impractical to do so in some cases). For training the DNN, input source distributions Xp and Xq may be randomly generated information sets, such that Xp={Xp[1],Xp[2], Xp[3],Xp[4], . . . Xp[$M_p$]} and Xq={Xq[1],Xq[2], Xq[3],Xq[4], . . . Xq[$M_q$]}. The two information sets Xp and Xq are encoded by the UE-p transmitter emulator 1002 and the UE-q transmitter emulator 1004, respectively. The two encoded blocks are then passed to the UE-p channel emulator 1012. Because the focus is on the received distributions at UE-p for now, only the UE-p channel needs to be considered. Expected channel noise may be represented by a noise source 1020 (e.g., a white noise emulator) and added to the encoded signal blocks. The result is the received distributions Yp={Yp[1], Yp[2], Yp[3],Yp[4], . . . Yp[$M_p$]} and Yq={Yq[1],Yq[2], Yq[3],Yq[4], . . . Yq[$M_q$]} in the receiver domain of UE-p. Yp and Yq are emulated signal blocks in the UE-p receiver domain (because the UE-p channel emulator 1012 was used for generating both Yp and Yq). It should be noted that many such data samples for Yp and Yq may be generated, for training the DNN. In FIG. 10, a measurement DNN 1050 is used to output a distance measurement $D_p$(P,Q).

Design of the measurement DNN 1050 requires some consideration. The loss function should be properly selected for training the measurement DNN 1050. For example, the loss function must be differentiable. It should be noted that the distance measurement Dp(P,Q) is the distance measured from the perspective of the UE-p receiver. The distance measurement Dq(P,Q) is the distance measured from the perspective of the UE-q receiver. The measurements Dp and Dq may not be equal, for example because the UE-p channel and UE-q channel have different characteristics.

Selection of the loss function is now described. In a neural network, the definition of a loss function (or reward function) is used to train the network for an intended purpose. The distance between two signal distributions may be difficult to measure, due to possibly irregular signal distributions in a high dimensional space (and in some cases even bases of the signal space may not be perfectly orthonormal), and there being any arbitrary number of paths to "walk" the distance between the two distributions.

In example approach disclosed herein, the Wasserstein distance (W-distance) is used rather than the Jensen Shannon distance (JSD). The disclosed approach involves dividing an irregular signal distribution into finite elements, then finding the shortest distance (lower bound) among infinite possibilities. Data samples are used to explore signal space.

To measure the cross-entropy for performing a binary classification between two signal distributions, the measurement DNN 1050 can be used to perform regression for measuring the W-distance between any two signal distributions in one common signal space. The W-distance is also called the "earth moving distance", and can be thought of conceptually as the amount of effort required to turn one signal distribution to a second signal distribution. The measurement DNN 1050 can be trained to measure the W-distance between two signal distributions. That is, with enough data samples Yp and Yq, the measurement DNN 1050 could be trained to converge into a measurement of W-distance on the domain of the UE-p receiver.

In the context of the example of FIG. 10, the subscript (P) may be used to indicate that the samples $Yp^{(p)}$ and $Yq^{(p)}$ are actually only from the perspective of the UE-p receiver. The loss function L may be represented as:

$$L(\{Y_p^{(p)}[1], Y_p^{(p)}[2], Y_p^{(p)}[3], \ldots Y_p^{(p)}[M]\},$$

-continued $$\{Y_q^{(p)}[1], Y_q^{(p)}[2], Y_q^{(p)}[3], \ldots Y_q^{(p)}[M]\}, \theta_p)$$

$$\begin{cases} \theta_p = \underset{\theta_p}{\operatorname{argmin}}\left(\frac{1}{M} \cdot \sum_{i=1}^{M} D(Y_q^{(p)}[i], \theta_p)\right) \\ \theta_p = \underset{\theta_p}{\operatorname{argmax}}\left(\frac{1}{M} \cdot \sum_{i=1}^{M} D(Y_p^{(p)}[i], \theta_p)\right) \end{cases}$$

The overall loss function $\theta_p$ is:

$$\theta_p = \underset{\theta_p}{\operatorname{argmin}}\left(\frac{1}{M} \cdot \sum_{i=1}^{M} [D(Y_q^{(p)}[i], \theta_p) - D(Y_p^{(p)}[i], \theta_p)]\right)$$

The loss function $\theta_p$ outputs a metric that represents the W-distance between two distributions $Y_p^{(p)}$ and $Y_q^{(p)}$. Training of the DNN using this loss function $\theta_p$ aims to adjust each neuron in the DNN to minimize the effort (loss) to change (or move) from one distribution to the other distribution. When the training finds that the effort cannot be further reduced, then the current effort is the minimum effort to move between the two distributions $Y_p^{(p)}$ and $Y_q^{(p)}$. The resultant minimum value (minimum loss) is the W-distance between the two distributions $Y_p^{(p)}$ and $Y_q^{(p)}$. Thus, after the training is done (converged), the output value of $D_p(P,Q;\theta)$ is a measurement of the W-distance estimated on the domain of the UE-p receiver:

$$\text{Wasserstein distance} = \frac{1}{M} \cdot \sum_{i=1}^{M} [D(Y_q^{(p)}[i], \theta_p^*) - D(Y_p^{(p)}[i], \theta_p^*)]$$

During training, particularly for back propagation, in order to avoid a gradient cliff problem, a regularization function may be used, such as:

$$\|D(Y_q^{(p)}[i], \theta_p) - D(Y_q^{(p)}[i]', \theta_p)\| \le C \cdot \|Y_q^{(p)}[i] - Y_q^{(p)}[i]'\|^\alpha$$

$$\left\|\frac{\partial D(Y_q^{(p)}[i], \theta_p)}{\partial Y_q^{(p)}[i]}\right\| \le C$$

Generally, a neural network as a whole may be considered to be a function, in this case having input Y and output D. Training of the neural network thus is a way to find a representation of the function. Given a number of data samples Y and D, there may be many different representations (different possible trained neural networks) to achieve the required function between input Y and output D. The regularization function serves to help avoid overfitting when training the neural network by favoring smaller weight values (or smaller neuron coefficients). Conceptually, the regularization function directs the training to explore the weight values in smaller steps rather than larger steps, and aims to avoid overly complex or overly deep neural networks. Using the regularization function, the derivation may be restricted by regularization parameter C.

As mentioned above, $D_p(P,Q)$ is the distance measurement from only the perspective of UE-p (i.e., only the UE-p receiver is considered. A similar procedure may be performed to obtain a distance measurement from only the perspective of UE-q (i.e., Dq(P,Q)). However, it would be desirable to develop a global neural network-based distance metric from all UE's perspectives. Using such a global distance measurement, the transmitter can optimize its transmissions with sufficiently separated signal distributions for all targeted recipients.

Figure 11:
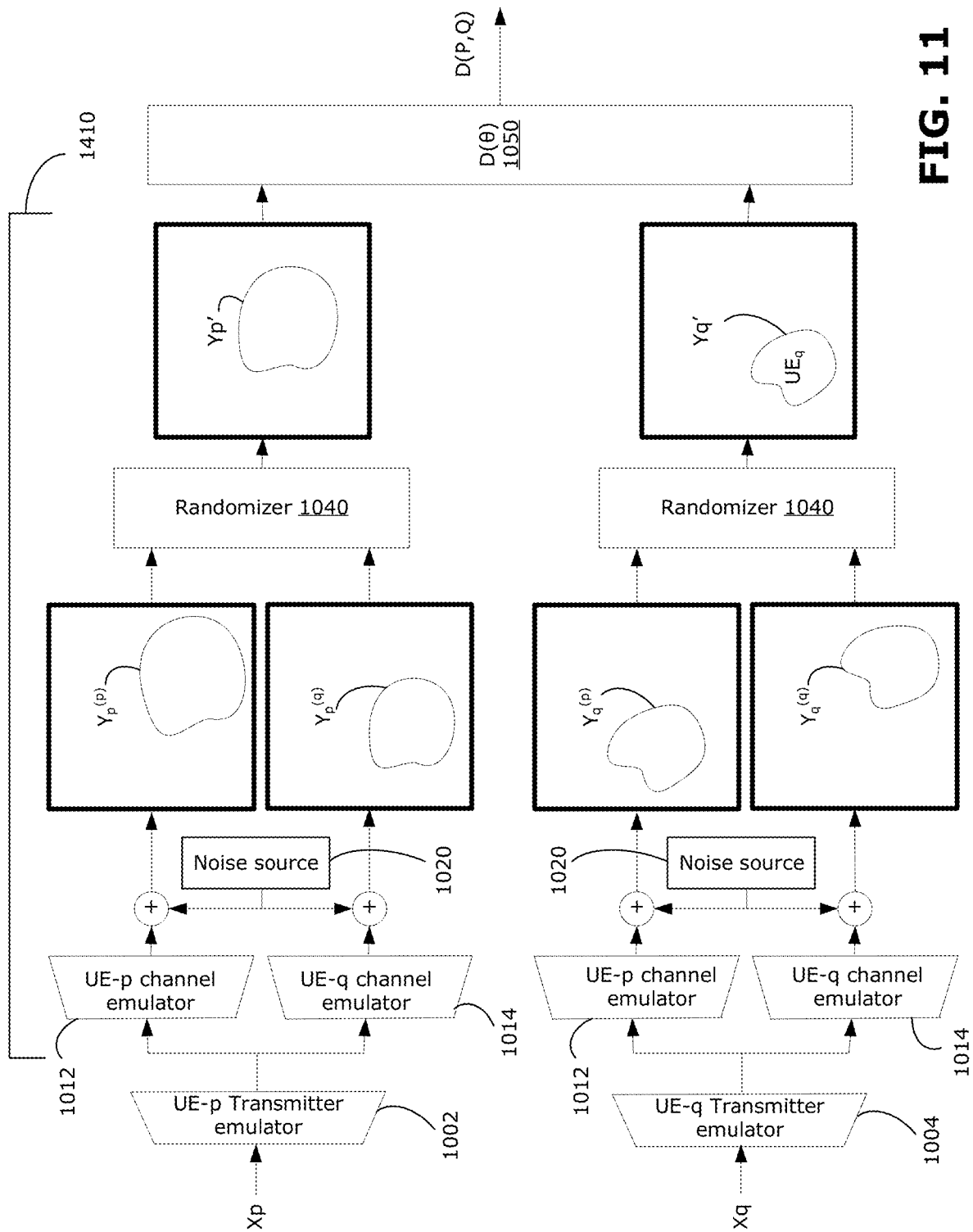
FIG. 11 is a schematic diagram illustrating an example implementation of a neural network-based system for measuring the distance between two signal distributions in two receiver domains.

FIG. 11 illustrates an example implementation of a DNN-based system for measuring the distance between two signal distributions. In particular, FIG. 11 extends FIG. 10 to enable consideration of more than one receiver domain. Such a system may be implemented in a transmitting apparatus (e.g., a BS 170) to enable tuning of transmissions to avoid interference at a receiving apparatus (e.g., an ED 110). Although described in some examples as being implemented at the transmitting apparatus, in other examples the disclosed DNN-based system may be implemented by another network entity (e.g., in the core network 130) and the output provided to the transmitting apparatus.

The example system of FIG. 11 enables a global distance measurement that is not specific to the perspective of any one recipient. The system of FIG. 11 shares many components in common with that of FIG. 10 described above, but with additions to extend to more than one receiver domain. In the example of FIG. 11, two receiver domains are discussed. However, it should be understood that the example implementation may be further extended to enable distance measurements over more than two receiver domains. One skilled in the art would readily understand how to make appropriate modifications to achieve this.

Similar to the example of FIG. 10, the characteristics of the UE-p channel, the characteristics of the UE-q channel, the UE-p transmitter and the UE-q transmitter are known and can be modeled using respective emulators. In some examples, the actual transmitters may be used instead of using transmitter emulators. In FIG. 11, the input sample Xp={Xp[1], Xp[2], ... Xp[M]}, which is a signal intended for UE-p, is encoded by the UE-p transmitter emulator 1002. The output of the UE-p transmitter emulator 1002 is provided to the UE-p channel emulator 1012 and the UE-q channel emulator 1014, which model the characteristics of the UE-p channel and the UE-q channel, respectively. Expected channel noise may be represented by a noise source 1020 (e.g., a white noise emulator) and added to the encoded signal blocks. In this example, a common noise source 1020 is used to add noise to the encoded signal blocks; in other examples, different noise sources may be used to add noise (e.g., in order to model different noise characteristics on the different channels). The result are distributions in different receiver domains. In this example, Xp is transformed to received distribution $Yp^{(p)}=\{Y_p^{(p)}[1], Y_p^{(p)}[2], \ldots Y_p^{(p)}[M/2]\}$ (in this example, the M input samples are split between the UE-p and UE-q channels, resulting in the index 1 ... M/2 for $Y_p^{(p)}$ and $Y_p^{(q)}$) in the receiver domain of UE-p, and transformed to received distribution $Y_p^{(p)}=\{Y_p^{(q)}[1], Y_p^{(q)}[2], \ldots Y_p^{(q)}[M/2]\}$ in the receiver domain of UE-q. $Y_p^{(p)}$ and $Y_p^{(q)}$ are randomly reordered by a randomizer 1040 into one vector $\vec{Y_{p_l}'}$ which is in a global domain (i.e., non-receiver-specific domain).

Similarly, the input sample Xq={Xq[1], Xq[2], ... Xq[M]}, which is a signal intended for UE-q, is encoded by a UE-q transmitter emulator 1004, then passed to the UE-p channel emulator 1012 and the UE-q channel emulator 1014. Channel noise may be modeled by the noise source 1020 and added to the encoded signal blocks. In some examples, different noise sources may be used to model different noise characteristics over different channels. In this example, Xq is transformed to received distribution $Yq^{(p)}$ ={$Y_q^{(p)}[1], Y_q^{(p)}[2], \ldots Y_q^{(p)}[M/2]$} in the receiver domain of UE-p, and transformed to received distribution $Yq^{(q)}$={$Y_q^{(q)}[1], Y_q^{(q)}[2], \ldots Y_q^{(q)}[M/2]$} in the receiver domain of UE-q. $Yq^{(p)}$ and $Yq^{(q)}$ are randomly reordered by the randomizer 1040 (which may be the same as or different from the randomizer used to generate $\overrightarrow{Y_{pl}}'$) into one vector $\overrightarrow{Y_{ql}}'$ which is in the global domain.

$\overrightarrow{Y_{pl}}'$ and $\overrightarrow{Y_{ql}}'$ are used as input to the measurement DNN 1050 to output the W-distance D(p,q). Notably, this measured distance is a combination of the scopes of UE-p and UE-q receivers, and thus may be considered to be a global measurement (i.e., not specific to any one receiver).

Although the above discussion is in the context of two receivers, it should be understood that there may be many more receivers taken into account. The use of the neural network-based approach may facilitate more complex optimization in higher dimensional space, for greater number of receivers.

In the present disclosure, the W-distance is used as the basis of distance measurement rather than JSD that is used in the Shannon-based approach.

Figure 12:
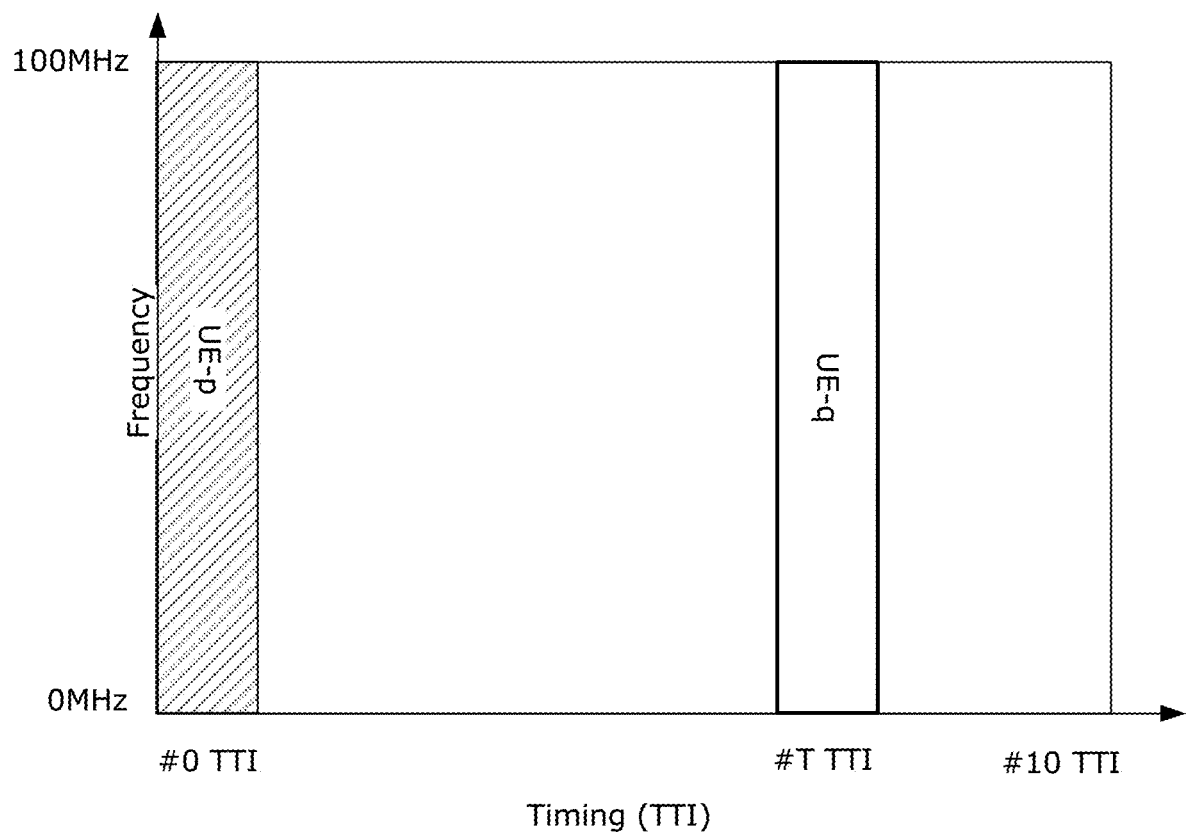
FIG. 12 illustrates a simple example of signal separation in the time domain.

FIG. 12 illustrates a simple example in TDMA where there is no overlapping in time (i.e., fully orthogonal). Assume UE-p and UE-q are equally powered and share a two-dimensional signal space. The dimensions are frequency (100 MHz) and time (10 TTIs). TDMA is used to separate the signal distributions from the two UEs. UE-p takes all the frequency band at TTI #0; whereas UE-q takes all the 100 MHz band at TTI #T. Channel distortions are not considered herein for simplicity. In the case of θ>=1 (i.e., fully orthogonal in TDMA), the JSD measurement is log(2), which is the maximum JSD value. This value indicates that the signal distributions are orthogonal (non-overlapping), but does not provide information about the amount of separation between signal distributions. On the other hand, the W-distance provides a measurement of temporal separation T (e.g., number of TTI between UE-p and UE-q signal distributions). This value indicates the amount of separation between the two signal distributions. Thus, the Shannon-based approach uses a JSD metric that offers a classification of whether two signal distributions are overlapping or non-overlapping. In contrast, the disclosed neural network-based approach, using W-distance, provides an actual measurement of the distance/overlap between two signal distributions.

Compared with a Shannon-based distance measurement, the disclosed NN-based distance measurement may be more global and more reflective of the true environment.

It should be appreciated that the W-distance output value is dependent on the DNN architecture. Thus, the design of the DNN should be reflective of the true deployment environment. If the architecture of the DNN is too simple, it may not accurately calculate higher dimensional W-distance. Further, a well-designed DNN architecture may facilitate global optimization of signal distributions on all dimensions of interest.

Figure 13A:
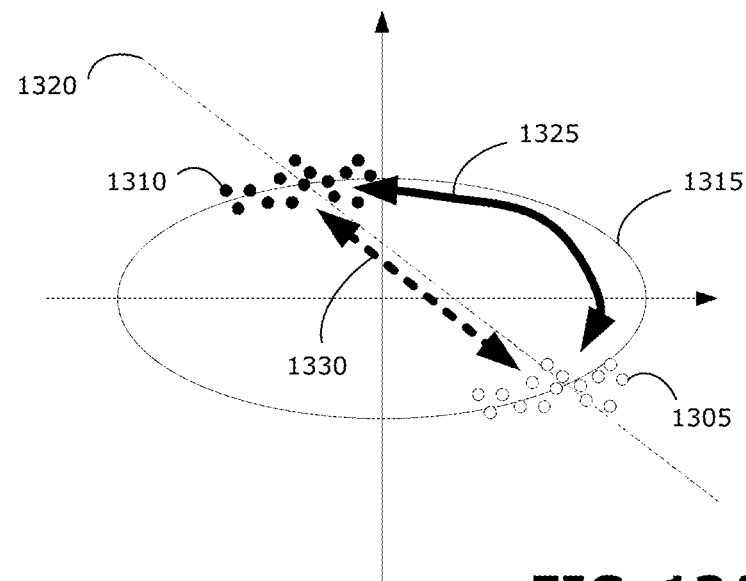
FIGS. 13A and 13B are diagrams illustrating how measurement of signal separation may be affected by the function used for measurement.
Figure 13B:
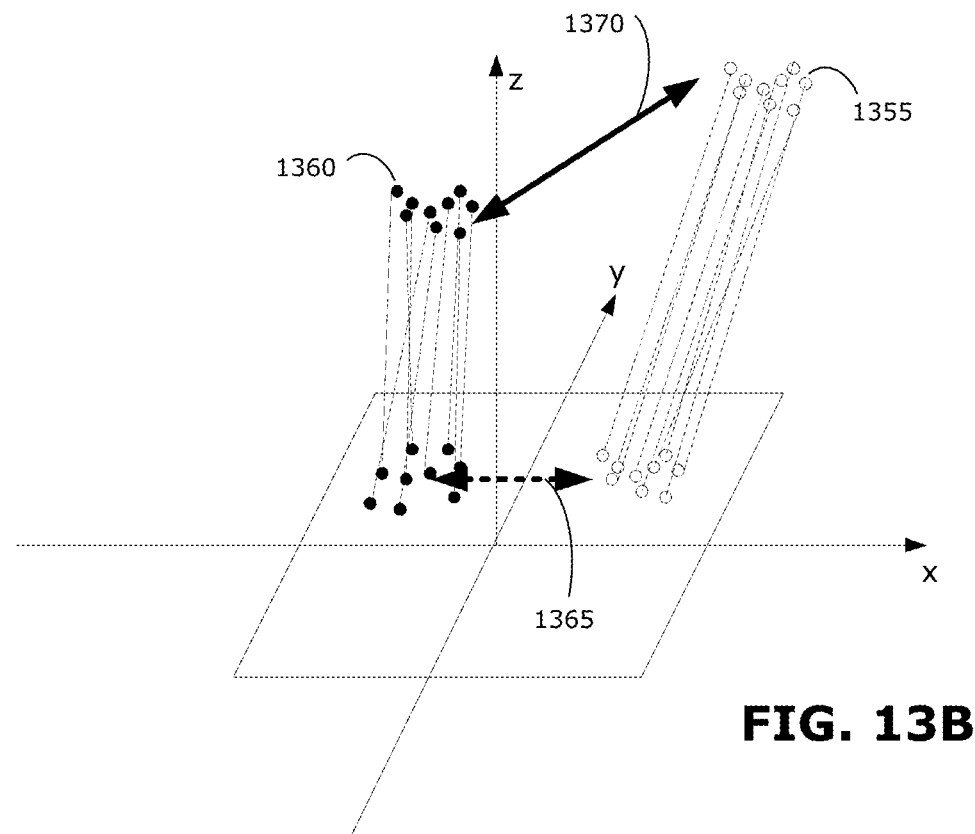

FIGS. 13A and 13B help to illustrate the importance of proper design of the DNN. A DNN architecture may be thought of, in mathematical terms, as a definition of a function set. Training of the DNN may be thought of as using sample data to explore this function set, in order to determine the parameters of the function set. FIG. 13A illustrates two sets of data samples 1305 and 1310 in a two-dimensional space. Even within the same dimension, the distance between the two sets of data samples 1305, 1310 may be evaluated using a first function set such as the function $X^2/\theta_1+Y^2/\theta_2=1$ (shown as solid line oval 1315) or a second function set such as the function $X/\theta_1+Y/\theta_2=1$ (shown as broken line diagonal 1320). The distance as measured along the first function set, illustrated as solid curved arrow 1325, is clearly different from the distance as measured along the second function set, illustrated as dashed arrow 1330.

The dimension of the DNN architecture is also an important design consideration for obtaining an accurate distance measurement. FIG. 13B shows two sets of data samples 1355 and 1360 that are in three-dimensional space. The distance may be measured using a first DNN architecture designed for two-dimensional space, or a second DNN architecture designed for three-dimensional space. When measured using the first DNN architecture, the distance is measured based on projection of the data samples 1355, 1360 onto the two-dimensional space. The distance measured by the first DNN architecture (shown as broken arrow 1365) may be different from the true, three-dimensional distance (shown as solid arrow 1370) between the data samples 1355, 1360.

Thus, each different deployment environment should have a different adaptive DNN tailored to measure distance in that specific environment. This ability to be environment-specific is currently not possible using the conventional Shannon-based approach that is based on a two-dimensional signal space and Gaussian-assumption-derived function set.

In the disclosed neural network-based approach, the DNN architecture is built based on each particular application scenario and deployment environment, and may also take into consideration the network traffic. For example, specific application scenarios such as eMBB, uRLLC, mMTC would each have a respective corresponding DNN architecture for measuring W-distance. Once the architecture of the measurement DNN 1050 has been defined, the measurement DNN 1050 can be used to measure the W-distance between any two signal distributions. The transmitters and their configurations (e.g., in the PHY and MAC layers) may then be optimized accordingly (e.g., using another machine-learning based approach, for example using transmitter DNNs as described further below, or using a transmitter function) to achieve the desired signal distributions. Once a receiver has information about the transmitter (e.g., transmitter DNN or transmitter function), the receiver may easily derive the corresponding receiver DNN or receiver function.

Examples of the present disclosure may be implemented using a standards-based approach. For example, a standard may pre-define a set of measurement DNN 1050 architectures for different types of deployment. The pre-defined DNN architectures may have been developed for certain expected or typical deployment conditions (e.g., typical environment conditions and traffic model, etc.). A measurement DNN architecture may be selected from the pre-defined set of measurement DNN architectures, for UL and DL communications.

An example implementation for DL communications is now discussed. In this example, the selection of a measurement DNN architecture is performed by a BS 170, and the BS 170 informs its associated EDs 110 about the selected DNN architecture. However, this is not intended to be limiting. In other examples, the selection of the DNN architecture may be performed by another network entity, such as a component of the core network 130, or a base station controller (BSC), among other possibilities. If the DNN architecture is selected by an entity other than the BS 170, the BS 170 may communicate with that entity in order to carry out the DNN architecture selection.

When the BS 170 is initiated (e.g., first activated), the BS 170 sends out a number of reference signals to connected EDs 110. The reference signals may be sent over legacy channels using legacy transmitters, for example. Each ED 110 uses the reference signals to perform channel measurement, and each ED 110 sends feedback to the BS 170. The BS 170 converges the feedback information received from different EDs 110. When sufficient information has been accumulated (e.g., further feedback information no longer contribute new statistical information about the channel), the BS 170 uses information about the channel and environment to select one of the predefined transmitter DNN architectures (or functions) to be used at the transmitter. The selection of the transmitter DNN architecture (or function) may be based on criteria that may be defined depending on implementation, such as ED receiving capability, or deployment, among other possibilities. One selection criteria may be to select a DNN architecture that achieves the largest average W-distance for all active EDs 110 connected to the BS 170. In some examples, there may be more than one DNN architecture that is found to satisfy the selection criteria, in which case the BS 170 may make an arbitrary selection, or may base the selection on a default order. After the BS 170 has selected the transmitter DNN architecture (or function), the BS 170 provides information about the selected DNN architecture to the EDs 110, for example via a broadcast message or legacy controlling message. The information about the selected transmitter DNN architecture (or function) may be an index or other indicator of which DNN architecture (or function), among the predefined architectures (or functions), has been selected. In other examples, such as in the case where the EDs 110 do not have the set of predefined architectures (or functions) stored in memory, the BS 170 may send information defining the transmitter DNN architecture (e.g., number of nodes, etc.) (or function) to enable the EDs 110 to derive and implement the corresponding receiver DNN architecture (or function).

The BS 170 may continue to monitor the channel and/or traffic conditions and determine if a different transmitter DNN architecture (or function) is required. For example, the BS 170 may send periodic or intermittent reference signals and receive feedback from the EDs 110. The BS 170 may compare the received feedback to determine if there has been any significant changes to the channel and/or traffic conditions. If there has been any significant change, the BS 170 may use its selection criteria to select a different transmitter DNN architecture (or function) and broadcast this information to the EDs 110. The selection of transmitter DNN architecture (or function) and communication of the selected architecture (or function) to the EDs 110 may take place in a relatively short time frame (e.g., within one TTI). This may help reduce latency, and may enable the BS 170 to dynamically respond to channel conditions.

An example implementation for UL communications is now discussed. Similarly to the example discussed above in the context of DL communications, this example describes the selection of the DNN architecture being performed at the BS 170, however this is not intended to be limiting. The selection of DNN architecture for UL communications may be performed together with selection of DNN architecture for DL communications.

When the BS 170 is initiated (e.g., first activated), the BS 170 sends requests to the connected EDs 110 to send UL reference signals. The reference signals may be sent over legacy channels using legacy transmitters, for example. The BS 170 uses the reference signals to determine information about the channel condition. When sufficient information has been accumulated (e.g., further UL reference signals no longer contribute new statistical information about the channel), the BS 170 selects one of the predefined measurement DNN architectures to be used at the transmitter to estimate the W-distance (e.g., with the use of emulation). The selection of the transmitter DNN architecture may be based on criteria that may be defined depending on implementation or deployment. One selection criteria may be to select a DNN architecture that achieves the largest average W-distance for all active EDs 110 connected to the BS 170. In some examples, there may be more than one DNN architecture that is found to satisfy the selection criteria, in which case the BS 170 may make an arbitrary selection, or may base the selection on a default order. After the BS 170 has selected the DNN architecture, the BS 170 provides information about the selected DNN architecture to the EDs 110, for example via a broadcast message. The information about the selected DNN architecture may be an index or other indicator of which DNN architecture, among the predefined architectures, has been selected. In other examples, such as in the case where the EDs 110 do not have the set of predefined architectures stored in memory, the BS 170 may send information defining the DNN architecture (e.g., number of nodes, etc.) to enable the EDs 110 to implement the DNN architecture at the transmitter.

The BS 170 may continue to monitor the channel and/or traffic conditions and determine if a different DNN architecture is required. For example, the BS 170 may periodically or intermittently request EDs 110 to send UL reference signals. The BS 170 may use the reference signals to determine channel condition and to determine if there has been any significant changes to the channel and/or traffic conditions. If there has been any significant change, the BS 170 may use its selection criteria to select a different DNN architecture and broadcast this information to the EDs 110. The selection of DNN architecture and communication of the selected architecture to the EDs 110 may take place in a relatively short time frame (e.g., within one TTI). This may help reduce latency, and may enable the BS 170 and EDs 110 to dynamically respond to channel conditions.

After the DNN architecture has been selected (for UL or DL communications), the measurement of the W-distance may be used to determine a suitable physical layer for shaping the transmission signal distributions.

In some examples, the disclosed neural network-based distance metric may be used to help determine a neural network-based transmitter, for example a transmitter that may be optimized globally for a given environment. An example of a neural network-based approach for generating transmission signal distributions has been described in U.S. provisional patent application No. 62/826,034, filed Mar. 29, 2019 entitled "A METHOD AND APPARATUS FOR GENERATE WAVEFORM BY POLARIZATION NETWORK (S)". A DNN for performing W-distance measurements may be used together with a DNN for generating transmission signal distributions, in an arrangement similar to a generative adversarial network (GAN), for example.

Figure 14:
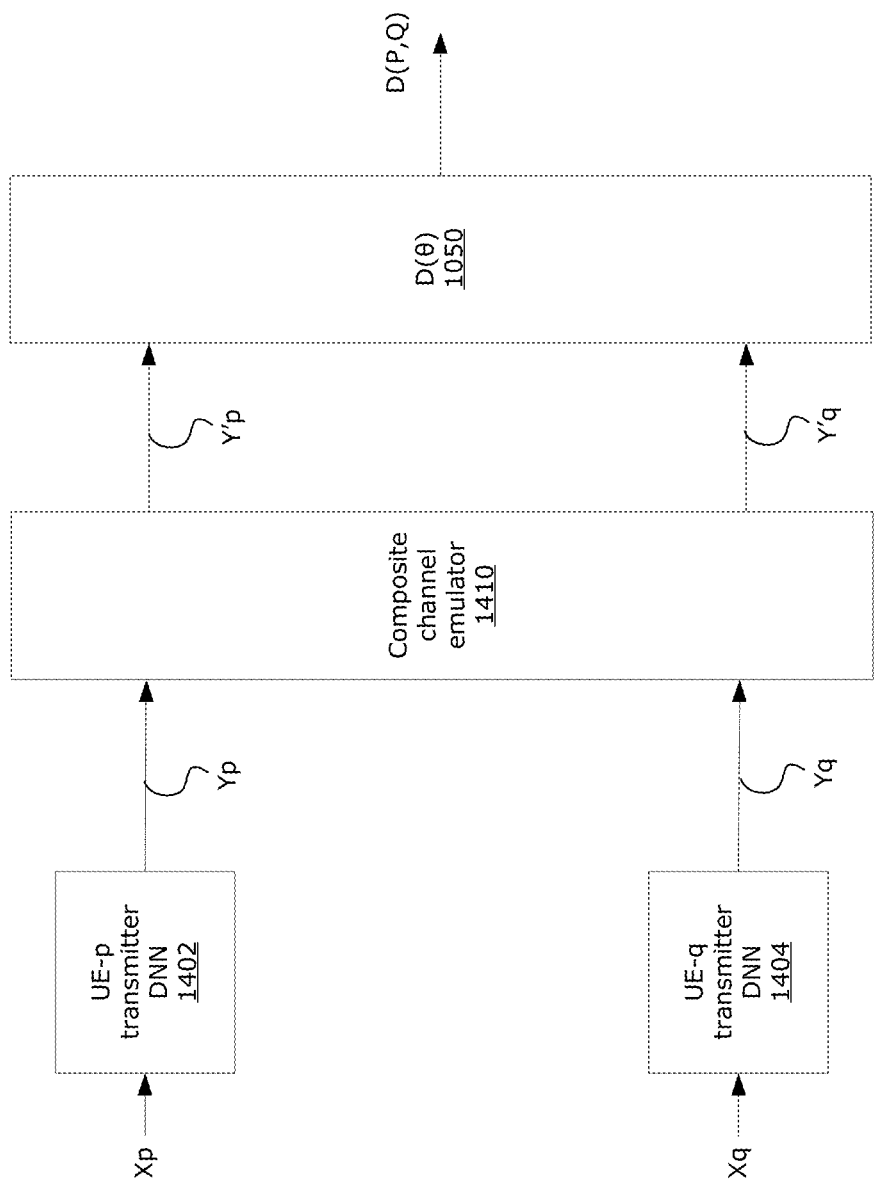
FIG. 14 illustrates an example implementation of a system for a DNN-based approach for generating transmitters, using W-distance measurements as disclosed.

FIG. 14 illustrates an example implementation of a system for a DNN-based approach for generating transmitters, using W-distance measurements. Such a system may be implemented in a transmitting apparatus (e.g., a BS 170) to enable tuning of transmissions to avoid interference at a receiving apparatus (e.g., an ED 110). The example of FIG. 14 may be compared with the example of FIG. 11. In the example of FIG. 11, the transmitter emulators 1002, 1004 may represent transmitters that are implemented using functions (e.g., as specified by a standard). In the example of FIG. 14, transmitter DNNs may be used instead.

In FIG. 14, the blocks depicted in FIG. 11 between the transmitter emulators 1002, 1004 and the measurement DNN 1050 (as indicated by bracket 1410 in FIG. 11) may be represented (for simplicity) as a composite channel emulator 1410 for both UE-p and UE-q. In FIG. 14, the transmitter at UE-p is implemented by a UE-p transmitter DNN 1402, and the transmitter at UE-q is implemented by a UE-q transmitter DNN 1404. Both the transmitter DNNs 1402, 1404 may be implemented at the BS 170, and each transmitter DNN 1402, 1404 is intended to generate transmission signal distributions for a respective different ED 110 (namely, UE-p and UE-q) that is associated with the BS 170. The present discussion focuses on transmission of signal distributions to two EDs 110. Later discussion will extend this approach to more than two EDs 110.

Training of the transmitter DNNs 1402, 1404 may be performed in an iterative way, to arrive at transmitter DNNs 1402, 1404 that generate transmission signal distributions having a satisfactory W-distance (as measured by the measurement DNN 1050).

Figure 15:
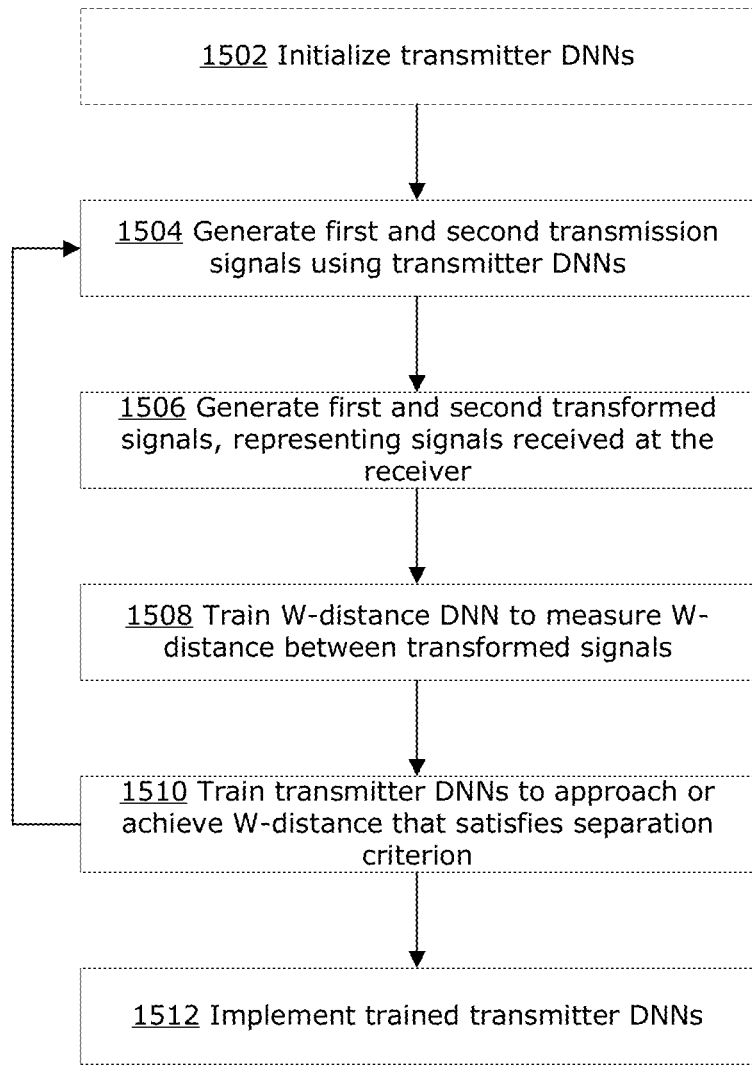
FIG. 15 is a flowchart showing an example method for training transmitter DNNs, using W-distance measurement as disclosed.

FIG. 15 is a flowchart illustrating an example method 1500 for generating transmitter DNNs 1402, 1404, according to embodiments of the present disclosure. In particular, the desired transmitter DNNs 1402, 1404 are generated to achieve a measured W-distance that satisfies a predefined separation criterion (e.g., the measured W-distance is at or above a predefined threshold value). The separation criterion may have been defined to ensure separation of signal distributions in the common signal space, with an amount of leeway for measurement error for example. The method 1500 may be implemented in the transmitting apparatus (e.g., BS 170).

At 1502, optionally, each transmitter DNN 1402, 1404 is first initialized, for example using random values for the weight coefficients. In some examples, the transmitter DNNs 1402, 1404 may be initialized using stored coefficient values, such as a previous set of values resulting from a previous training. In some examples, initialization may be omitted, for example if the transmitter DNNs 1402, 1404 have already been trained and are being updated, the method 1500 may simply use the already trained coefficients of the transmitter DNNs 1402, 1404 as a starting point.

At 1504, each transmitter DNN 1402, 1404 is used to generate respective first and second transmission signals Yp and Yq. As shown, a random input sample Xp={Xp[1], Xp[2], ... Xp[M]} may be inputted to the UE-p transmitter DNN 1402, which generates a first transmission signal distribution Yp. Similarly, a random input sample Xq={Xq[1], Xq[2], ... Xq[M]} may be inputted to the UE-q transmitter DNN 1404, which generates a second transmission signal distribution Yq.

At 1506, the generated transmission signal distributions Yp and Yq are inputted to the composite channel emulator 1410, to simulate the effect of the transmission channel (e.g., including addition of noise). The output of the composite channel emulator 1410 are the first and second transformed signal distributions Y'p and Y'q, which represent the signal distributions that would be received at the receiver.

At 1508, Y'p and Y'q are used to train the measurement DNN 1050, to measure the W-distance between the transformed signal distributions Y'p and Y'q. The output D(P,Q) indicates the W-distance of the signal distributions received at the receiver. As explained the embodiments above, a DNN may regard a signal distribution as a manifold in a high dimensional space and the DNN may be trained using a loss function representing a distance between distributions in order to find the W-distance.

At 1510, the measurement DNN 1050 is fixed, and the transmitter DNNs 1402, 1404 are trained to approach or achieve the W-distance that satisfies the predefined separation criterion, as measured by the fixed measurement DNN 1050. In other words, the transmitter DNNs 1402, 1404 are trained to generate first and second transmission signal distributions Yp and Yq that, when transformed into the transformed signal distributions Y'p and Y'q are separated by the predefined separation criterion as closely as possible in the receiver domain.

If the predefined separation criterion is not achieved after training at 1510, the trained transmitter DNNs 1402, 1404 are then fixed and the method 1500 returns to 1504 to retrain the measurement DNN 1050 to measure the W-distance of the new signal distributions generated by the fixed transmitter DNNs 1402, 1404 trained in the previous iteration. This may be considered tandem training of the measurement DNN 1050 and the transmitter DNNs 1402, 1404. In one iteration, the transmitter DNNs 1402, 1404 are fixed and generates many sample distributions. These sample distributions are transformed into the receiver domain and measured to find the W-distance between the distributions in the receiver domain. The measurement is accomplished via training the measurement DNN 1050. After the minimum W-distance is found by the measurement DNN 1050, the measurement DNN 1050 is fixed, and the transmitter DNNs 1402, 1404 are trained with the goal to approach and achieve an observed W-distance by the fixed measurement DNN 1050 that satisfies a predefined separation criterion.

The steps 1504-1510 are repeated until the signal distributions generated by the transmitter DNNs 1402, 1404 achieve a measured W-distance that satisfies the predefined separation criterion (e.g., the measured W-distance is at or above a predefined threshold value). The separation criterion may have been defined to ensure separation of signal distributions in the common signal space, with an amount of leeway for measurement error for example. The separation criterion may be selected to reflect the true environment and deployment. For example, the separation criterion may be a separation of at least 10 TTI in the time dimension, in the case where the deployment includes a time dimension.

At 1512, when the transmitter DNNs 1402, 1404 have been satisfactorily trained, the trained transmitter DNNs 1402, 1404 may be implemented at the BS 170 to shape transmission signal distributions to two EDs 110 (namely UE-p and UE-q). In some examples, the BS 170 may communicate information to enable the EDs 110 to decode the received signal distributions. For example, the BS 170 may provide the EDs 110 with information about the trained transmitter DNNS 1402, 1404 (e.g., the trained coefficients of the transmitter DNNs 1402, 1404) to enable the EDs 110 to implement corresponding receiving neural networks (e.g., implemented using an inverse of the transmitter DNNs 1402, 1404), so that the receivers at the EDs 110 can receive respective signals from the common signal space. The BS 170 may provide this information to the EDs 110 over legacy channels, for example. The trained measurement DNN 1050 may not be needed after the transmitter DNNs 1402, 1404 have been satisfactorily trained, and the measurement DNN 1050 may be discarded or otherwise disregarded. In some examples, even after the transmitter DNNs 1402, 1404 have been trained, the measurement DNN 1050 may be maintained, for example in order to perform periodic or intermittent measurement of the W-distance between the transmitted signal distributions.

As previously mentioned, this approach to designing the transmitters for two receivers may be extended to designing the transmitters for more than two receivers.

Figure 16:
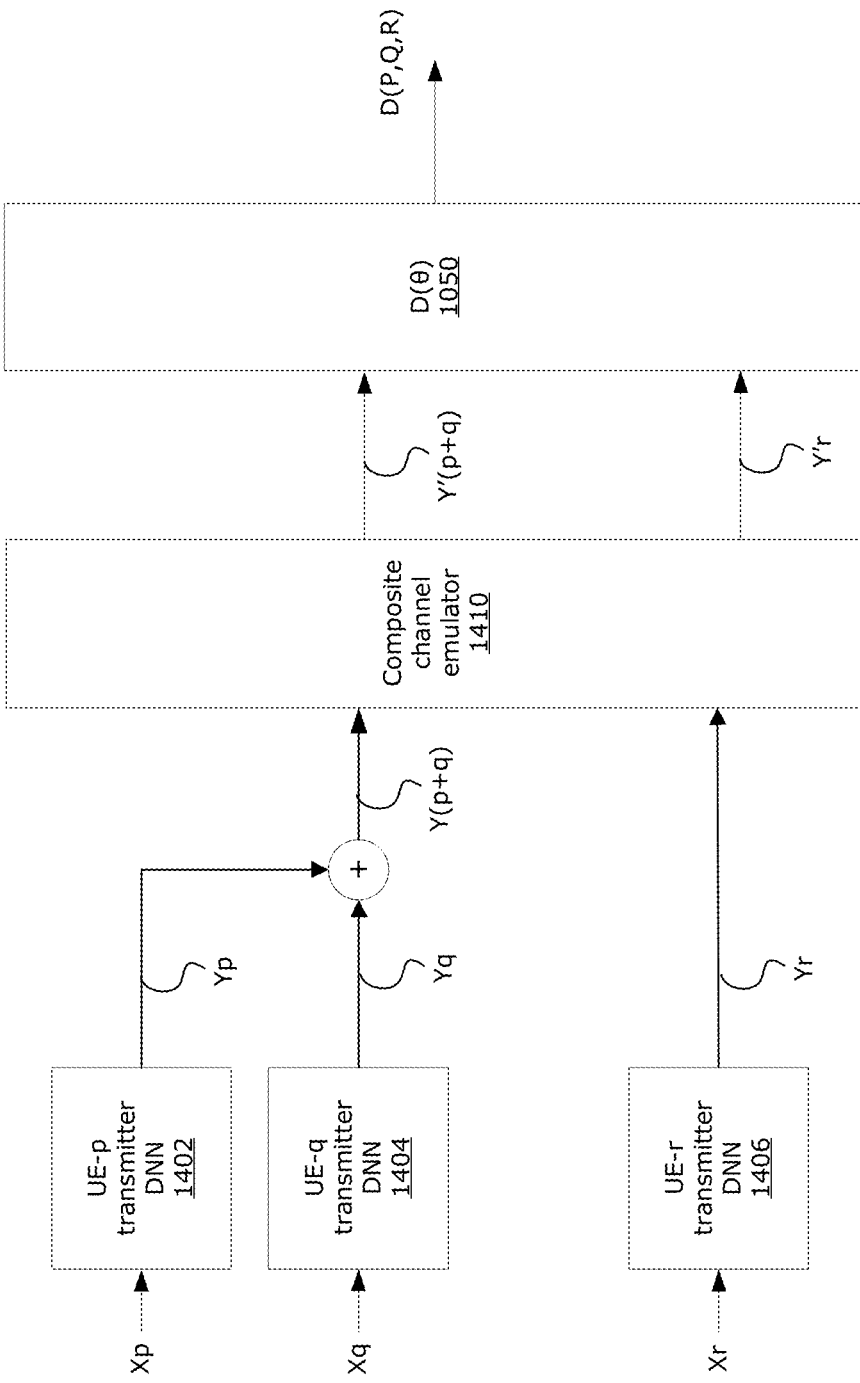
FIG. 16 illustrates an example implementation of a system for a DNN-based approach for generating transmitters for multiple receivers, using W-distance measurements as disclosed.

FIG. 16 illustrates an example implementation of a system for a DNN-based approach for generating transmitters, using W-distance measurements. FIG. 16 is similar to FIG. 14 and shares many common blocks, but extends the approach to designing transmitters for more than two receivers. The system of FIG. 16 may be implemented in a transmitting apparatus (e.g., a BS 170) to enable tuning of transmissions to avoid interference at more than two receiving apparatuses (e.g., an ED 110).

In FIG. 16, it is assumed that the UE-p transmitter DNN 1402 and the UE-q transmitter DNN 1404 have been trained (e.g., as discussed above). This may also be referred to as the UE-p and UE-q EDs 110 having been successfully "paired" by the BS 170. The processing for pairing the UE-q and UE-q EDs 110 may be repeated to add a transmission to a third ED 110, namely UE-r. The composite channel emulator 1410 in FIG. 16 represents the channels for all three EDs 110, namely UE-p, UE-q and UE-r.

The transmitter at UE-r is implemented by a UE-r transmitter DNN 1406. A random input sample Xr is inputted to the UE-r transmitter DNN 1406 to generate the third output signal distribution Yr. The UE-p and UE-q transmitter DNNs 1402, 1404 have been trained, and are fixed. The output of the UE-p and UE-q transmitter DNNs 1402, 1404 are combined into the combined signal distribution Y(p+q). The composite channel emulator 1410 transforms these signal distributions into the transformed combined signal distribution Y'(p+q) (representing the combination of the received UE-p and UE-q signal distributions) and the third transformed signal distribution Y'r (representing the received UE-r signal distribution). The measurement DNN 1050 is used to measure the W-distance between the transformed signal distributions. Specifically, because Y'(p+q) represents the combined received UE-p and UE-q signal distributions, the measured W-distance indicates the distance between Y'r and each of Y'p and Y'q.

To train the UE-r transmitter DNN 1406, a method similar to that of FIG. 15 may be used. However, the UE-p and UE-q transmitter DNNs 1402, 1404 are fixed (having already been satisfactorily trained) and the UE-r transmitter DNN 1406 is trained. In particular, the UE-r transmitter DNN 1406 is trained using the iterative approach described above while keeping the UE-q and UE-q transmitter DNNs 1402, 1404 fixed, until the W-distance outputted by the measurement DNN 1050 satisfies a separation criterion (e.g., the measured W-distance is at or above a predefined threshold value). When the UE-r transmitter DNN 1406 has been satisfactorily trained, the UE-r ED 110 is considered to be successfully paired or grouped with the UE-p and UE-q EDs 110.

A fourth ED 110 (not shown) may then be grouped by fixing the already trained UE-p, UE-q and UE-r transmitter DNNs 1402, 1404, 1406, and training a fourth transmitter DNN using the approach described above. In this way, one by one, additional receivers can be scheduled into a common signal space. This process may be repeated until transmitter DNNs for all EDs 110 associated with the BS 170 have been successfully trained, or until no more transmission signal distributions can be satisfactorily fitted into the common signal space (e.g., a new transmitter DNN cannot be trained to achieve a W-distance that satisfies a separation criterion from other signal distributions). It should be appreciate that, although the transmitter DNNs are trained to shape source signal distributions into transmission signal distributions (in the transmitter domain), the W-distance is measured for the received signal distributions (in the receiver domain). In this way, the effect of the environment and channel is taken into account, and can be used to help separate signal distributions at the receiver.

As previously mentioned, after the transmitter DNNs have been satisfactorily trained, transmission to the receivers may then take place using the trained transmitter DNNs (e.g., implemented at the BS 170). The BS 170 may maintain the measurement DNN 1050 in order to continue monitoring the W-distances of the transmitted signal distributions during operation. For example, during operation, each ED 110 may provide feedback to the BS 170 with information about channel conditions. The BS 170 may use this information to update the channel emulator, and update W-distance measurements using the measurement DNN 1050. If the measured W-distance becomes unsatisfactory (e.g., the W-distance between any two received signal distributions becomes too low, such as falling below a predefined threshold value), the BS 170 may take remedial action. The BS 170 may, for example, drop one or more EDs 110 from transmission. The dropped ED(s) 110 may be those found to have the smallest W-distance, or may be the most recently joined ED(s) 110, for example. Alternatively or additionally, the BS 170 may retrain the transmitter DNNs for one or more EDs 110, using the process described above.

Generally, the training of transmitter DNNs and training the measurement DNN to measure the W-distance between signal distributions may both take place during an initiation phase. Such training may be considered to take place "offline", prior to UL and/or DL communication of data. Although the above examples describe the training as taking place at the BS, in other examples the training may take place, at least in part, outside of the BS (e.g., in a component of the core network, or in a remote database center, among other possibilities). Further, the training of transmitter DNNs and training the measurement DNN to measure the W-distance may also take place during operation (i.e., take place "online"). For example, as discussed above there may be continuous or periodic measuring of the W-distance between transmitted signal distributions using the measurement DNN, during UL and/or DL communication of data. The measurement of W-distance and retraining of DNNs (if required) may take place in a relatively short period of time (e.g., one or two TTIs). This may help reduce latency, and may enable the BS to dynamically respond to changing channel conditions.

It should be noted that a conventional proportional-fairness scheduler typically only handles the bandwidth and code rate, because of the basis in Shannon distance. In contrast, the disclosed neural network-based approach is able to allocate usage of a multi-dimensional signal space (not limited to bandwidth and code rate).

Using the disclosed neural network-based distance measurement, a more precise measurement of signal separation may be obtained. The measurement of W-distance, using a DNN-based approach, may enable shaping and close packing of transmission signal distributions in a higher multi-dimensional signal space. For example, transmitters may be designed to generate transmission signal distributions that, when transformed into the receiver domain, have a measured W-distance that satisfies a separation criterion. By taking into account the channel condition when measuring the W-distance at the receiver, the disclosed approach may enable the transmitter (e.g., the BS) to take advantage of the channel to separate signal distributions at the receiver, rather than requiring complete separation of the signal distributions at the transmitter.

In some examples, the conventional Shannon-based approach to measurement of signal separation may be used together with the disclosed neural network-based approach. For example, a Shannon-based measurement may be first used as a coarse measurement of signal separation, and the neural network-based approach may be further used as a fine measurement of signal separation (e.g., in order to more closely pack multiple signal distributions in the common signal space).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus comprising:
a first transmitter;
a second transmitter;
a first transmitter emulator configured to shape a first source signal distribution in a transmitter domain to a first transmission signal distribution, the first transmitter emulator emulating parameters of the first transmitter;
a second transmitter emulator configured to shape a second source signal distribution in the transmitter domain to a second transmission signal distribution, the second transmitter emulator emulating parameters of the second transmitter; and
a processing unit configured to implement:
a channel emulator configured to receive the first and second transmission signal distributions and output first and second received signal distributions, the first and second received signal distributions representing transformation of the first and second transmission signal distributions, over a transmission channel, to a receiver domain of at least one receiving device; and
a measurement network configured to receive the first and second received signal distributions as input and output a measurement of a Wasserstein distance between the first and second received signal distributions in the receiver domain, the measurement network being a neural network that has been trained to minimize a loss function representing the Wasserstein distance between the first and second transmission signal distributions, wherein a minimized value of the loss function is outputted as the measurement of the Wasserstein distance;
wherein the processing unit is further configured to:
when the measurement of the Wasserstein distance satisfies a separation criterion, implement the parameters emulated by the first transmitter emulator in the first transmitter, and implement the parameters emulated by the second transmitter emulator in the second transmitter.

2. The apparatus of claim 1, wherein the measurement network is trained to measure the Wasserstein distance between two signal distributions by defining each signal distribution as a respective finite set of subspaces, and the Wasserstein distance is calculated by calculating Wasserstein distance between each set of subspaces.

3. The apparatus of claim 1, wherein the measurement network has a neural network architecture that is selected from a set of predefined network architectures.

4. The apparatus of claim 3, wherein the neural network architecture is selected based on information about at least one of the transmission channel or environment.

5. The apparatus of claim 4, wherein the apparatus is configured to receive the information about the transmission channel or environment from the at least one receiving device, and wherein the apparatus is further configured to transmit information about the selected neural network architecture to the at least one receiving device.

6. The apparatus of claim 1, wherein the first transmitter emulator and the second transmitter emulator emulate first and second transmitters that are implemented by the apparatus using respective first and second neural networks.

7. The apparatus of claim 6, wherein the first and second neural networks have been trained to generate first and second transmission signal distributions that, after transformation by the channel emulator, result in first and second received signal distributions that have a Wasserstein distance satisfying a separation criterion.

8. A method for implementing transmitters at a transmitting apparatus, the method comprising:
generating a first transmission signal distribution from an input sample, using a first transmitter that is implemented using a first transmitter neural network;

generating a second transmission signal distribution from another input sample, using a second transmitter that is implemented using a second transmitter neural network;

generating first and second transformed signal distributions from the first and second transmission signal distributions, the first and second transformed signal distributions representing transformation of the first and second transmission signal distributions, over a transmission channel, to a receiver domain of at least one receiving device;

measuring a Wasserstein distance between the first and second transformed signal distributions in the receiver domain, the Wasserstein distance being measured using a measurement network that is a neural network that has been trained to minimize a loss function representing the Wasserstein distance between the first and second transmission signal distributions, wherein a minimized value of the loss function is outputted as the measurement of the Wasserstein distance; and when the measured Wasserstein distance satisfies a separation criterion, implement the first and second transmitter neural networks at the transmitting apparatus, and send information about the first and second transmitter neural networks to the at least one receiving device to enable the at least one receiving device to implement at least one corresponding receiving neural network.

9. The method of claim 8, further comprising:
when the measured Wasserstein distance does not satisfy the separation criterion, performing one or more iterations of:
training the first and second transmitter neural networks to generate different first and second transmission signal distributions;
generating different first and second transformed signal distributions from the different first and second transmission signal distributions; and
measuring the Wasserstein distance between the different first and second transformed signal distributions;
wherein the one or more iterations are performed until the measured Wasserstein distance satisfies the separation criterion.

10. The method of claim 8, further comprising selecting an architecture of the measurement network from a set of predefined network architectures.

11. The method of claim 8, further comprising:
generating a third transmission signal distribution, using a third transmitter neural network;
generating a combined transformed signal distribution from a combination of the first and second transmission signal distributions, and generating a third transformed signal distribution from the third transmission signal distribution;

measuring a Wasserstein distance between the combined and third transformed signal distributions in the receiver domain, the measurement network being trained to minimize a loss function representing the Wasserstein distance between the combined and third transformed signal distributions, wherein a minimized value of the loss function is outputted as the measurement of the Wasserstein distance; and when the measured Wasserstein distance satisfies a separation criterion, further implement the third transmitter neural network at the transmitting apparatus and send information about the third transmitter neural network to the at least one receiving device.

12. The method of claim 8, wherein the first and second transformed signal distributions are generated by inputting the first and second transmission signal distributions into a channel emulator, the channel emulator representing characteristics of the transmission channel for the at least one receiving device.

13. The method of claim 12, further comprising:
receiving channel condition feedback from the at least one receiving device to update the channel emulator;
generating updated first and second transformed signal distributions using the updated channel emulator; and
measuring the Wasserstein distance between the updated first and second transformed signal distributions using the measurement network.

14. The apparatus of claim 1, wherein the first and second transmitters transmit to respective first and second receiving devices, and wherein the processing unit is further configured to cause the apparatus to:
transmit, to the first receiving device, the parameters used to implement the first transmitter, to enable the first receiving device to decode the first transmission signal distribution; and
transmit, to the second receiving device, the parameters used to implement the second transmitter, to enable the second receiving device to decode the second transmission signal distribution.

15. The apparatus of claim 14, wherein the first transmitter and the second transmitter are implemented by the apparatus using respective first and second neural networks, and wherein the parameters transmitted to the respective first and second receiving devices are the coefficients of the respective first and second neural networks.

16. The apparatus of claim 14, further comprising:
a legacy transmitter;
wherein the parameters used to implement the first transmitter and the parameters used to implement the second transmitter are transmitted to the respective first and second receiving devices using the legacy transmitter.

* * * * *